(12) United States Patent
Andersen et al.

(10) Patent No.: US 12,502,625 B1
(45) Date of Patent: Dec. 23, 2025

(54) HOMOGENOUS EMULSION FROM A GRAIN MATERIAL FERMENTATION

(71) Applicant: POET Research, Inc., Sioux Falls, SD (US)

(72) Inventors: Anna M. Andersen, Valley Springs, SD (US); Brett A. Flittie, Harrisburg, SD (US); Alex T. McCurdy, Sioux Falls, SD (US); Jacob A. Milbrandt, Tyndall, SD (US); Shannon S. Urban, Valley Springs, SD (US)

(73) Assignee: POET RESEARCH, INC., Sioux Falls, SD (US)

( * ) Notice: Subject to any disclaimer, the term of this patent is extended or adjusted under 35 U.S.C. 154(b) by 684 days.

(21) Appl. No.: 17/218,901

(22) Filed: Mar. 31, 2021

(51) Int. Cl.
| | |
|---|---|
| *B01D 19/04* | (2006.01) |
| *A23D 7/005* | (2006.01) |
| *A23D 7/04* | (2006.01) |
| *C02F 1/68* | (2023.01) |

(52) U.S. Cl.
CPC ....... *B01D 19/0404* (2013.01); *A23D 7/0053* (2013.01); *A23D 7/04* (2013.01); *C02F 1/68* (2013.01); *C02F 2303/12* (2013.01)

(58) Field of Classification Search
CPC .... B01D 19/0404; A23D 7/0053; A23D 7/04; C02F 1/68
See application file for complete search history.

(56) References Cited

U.S. PATENT DOCUMENTS

| | | | |
|---|---|---|---|
| 1,247,782 A | 11/1917 | Ayres | |
| 1,737,402 A | 11/1929 | Ayres | |
| 2,510,379 A | 6/1950 | Christenson | |
| 2,510,402 A | 6/1950 | Johnston | |
| 2,762,780 A | 9/1956 | Kulakow | |
| 2,881,195 A | 4/1959 | Hayes | |
| 3,354,188 A | 11/1967 | Bock | |
| 4,049,686 A | 9/1977 | Ringers et al. | |
| 4,609,500 A | 9/1986 | Strecker | |
| 4,698,185 A | 10/1987 | Dijkstra et al. | |
| 4,713,155 A | 12/1987 | Arutjunian et al. | |
| 5,239,096 A | 8/1993 | Rohdenburg et al. | |
| 5,512,691 A | 4/1996 | Barnicki et al. | |

(Continued)

FOREIGN PATENT DOCUMENTS

| | | | | |
|---|---|---|---|---|
| EP | 2613642 B1 | * | 8/2016 | .............. A23D 9/00 |
| GB | 481580 A | | 3/1938 | |

(Continued)

OTHER PUBLICATIONS

Haumann, "Fat Modification—Interesterification Hydrogenation". INFORM, vol. 5, No. 6 (Year: 1994).*

(Continued)

*Primary Examiner* — Erik Kashnikow
*Assistant Examiner* — Assaf Zilbering
(74) *Attorney, Agent, or Firm* — Honigman LLP

(57) ABSTRACT

The present disclosure relates methods and systems for refining grain oil compositions using water, and related compositions produced therefrom. The present disclosure also relates to methods of using said compositions. The present disclosure also relates to methods of using grain oil derived from a fermentation product in an anti-foam composition. The present disclosure further relates to stabilized emulsion products and methods for forming thereof.

10 Claims, 21 Drawing Sheets

(56) References Cited

U.S. PATENT DOCUMENTS

| | | |
|---|---|---|
| 5,516,924 A | 5/1996 | van de Sande et al. |
| 6,015,915 A | 1/2000 | Jamil et al. |
| 6,033,706 A | 3/2000 | Silkeberg et al. |
| 6,103,918 A | 8/2000 | Dahlen |
| 6,407,271 B1 | 6/2002 | Deffense |
| 6,426,423 B1 | 7/2002 | Copeland et al. |
| 6,743,930 B2 | 6/2004 | Li |
| 6,844,458 B2 | 1/2005 | Copeland et al. |
| 6,924,381 B2 | 8/2005 | Dawson |
| 7,122,216 B2 | 10/2006 | Copeland et al. |
| 7,696,369 B2 | 4/2010 | Kellens et al. |
| 7,713,727 B2 | 5/2010 | Dayton et al. |
| 7,842,484 B2 | 11/2010 | Lewis |
| 7,879,917 B2 | 2/2011 | Cheng et al. |
| 7,893,115 B2 | 2/2011 | Cheng et al. |
| 7,919,291 B2 | 4/2011 | Lewis et al. |
| 8,008,516 B2 | 8/2011 | Cantrell et al. |
| 8,076,123 B2 | 12/2011 | Chou |
| 8,232,418 B1 | 7/2012 | Bilbie et al. |
| 8,435,766 B2 | 5/2013 | Kellens et al. |
| 8,702,819 B2 | 4/2014 | Bootsma |
| 8,962,059 B1 | 2/2015 | Froderman et al. |
| 9,045,712 B2 | 6/2015 | Dayton et al. |
| 9,061,987 B2 | 6/2015 | Bootsma |
| 9,109,179 B2 | 8/2015 | Cowin et al. |
| 9,144,758 B2 | 9/2015 | Wang et al. |
| 9,228,211 B2 | 1/2016 | Soe et al. |
| 9,255,239 B1 | 2/2016 | Wiese |
| 9,340,749 B1 | 5/2016 | Kozyuk et al. |
| 9,453,180 B2 | 9/2016 | Kozyuk et al. |
| 9,481,853 B2 | 11/2016 | Gordon et al. |
| 9,534,182 B1 | 1/2017 | Ballard |
| 9,534,184 B2 | 1/2017 | Thompson et al. |
| 9,556,399 B2 | 1/2017 | Kozyuk et al. |
| 9,695,449 B2 | 7/2017 | Bootsma |
| 9,896,643 B2 | 2/2018 | Redford |
| 9,961,916 B2 | 5/2018 | Arhancet et al. |
| 10,087,397 B2 | 10/2018 | Phillips et al. |
| 10,526,623 B2 | 1/2020 | Bootsma |
| 10,604,776 B2 | 3/2020 | McCurdy et al. |
| 10,711,221 B2 | 7/2020 | Lamprecht et al. |
| 10,815,430 B2 | 10/2020 | Gutierrez et al. |
| 10,815,506 B2 | 10/2020 | Rancke-Madsen et al. |
| 11,008,531 B2 | 5/2021 | Lamprecht et al. |
| 2006/0041152 A1 | 2/2006 | Cantrell et al. |
| 2008/0064889 A1 | 3/2008 | Palacios |
| 2008/0146851 A1 | 6/2008 | Schonemann et al. |
| 2009/0306419 A1 | 12/2009 | Myong et al. |
| 2010/0058649 A1 | 3/2010 | Bootsma |
| 2011/0086149 A1* | 4/2011 | Bootsma ............... C11B 13/00 426/627 |
| 2012/0245370 A1 | 9/2012 | Sheppard et al. |
| 2013/0109873 A1 | 5/2013 | Bootsma |
| 2015/0230488 A1 | 8/2015 | de Man et al. |
| 2015/0291923 A1 | 10/2015 | Bootsma |
| 2017/0066995 A1 | 3/2017 | Borst et al. |
| 2017/0107449 A1 | 4/2017 | Hruschka et al. |
| 2017/0107452 A1 | 4/2017 | Dasari et al. |
| 2017/0283838 A1 | 10/2017 | Bootsma |
| 2018/0340067 A1* | 11/2018 | McCurdy ............... C08K 5/101 |
| 2018/0340068 A1 | 11/2018 | McCurdy et al. |
| 2018/0340197 A1 | 11/2018 | McCurdy et al. |
| 2019/0249109 A1 | 8/2019 | Lamprecht et al. |
| 2019/0376002 A1* | 12/2019 | Urban ............... C11B 1/16 |
| 2020/0063168 A1 | 2/2020 | Bootsma |
| 2020/0165642 A1 | 5/2020 | McCurdy et al. |
| 2020/0299610 A1 | 9/2020 | Marques De Lima |
| 2021/0032564 A1 | 2/2021 | Urban et al. |

FOREIGN PATENT DOCUMENTS

| | | | |
|---|---|---|---|
| GB | 4181580 | 3/1938 | |
| GB | 766394 A | 1/1957 | |
| GB | 1065720 A | 4/1967 | |
| GB | 1562380 A | 3/1980 | |
| WO | 9323508 A1 | 11/1993 | |
| WO | 9421762 A1 | 9/1994 | |
| WO | 9801518 A1 | 1/1998 | |
| WO | 2004007654 A1 | 1/2004 | |
| WO | 2010053244 A1 | 5/2010 | |
| WO | 2014037008 A1 | 3/2014 | |
| WO | 2014158011 A1 | 10/2014 | |
| WO | 2015168020 A2 | 11/2015 | |
| WO | 2015181308 A1 | 12/2015 | |
| WO | 2016003465 A1 | 1/2016 | |
| WO | WO-2016149692 A1 * | 9/2016 | ............. A23K 20/10 |
| WO | 2016178676 A1 | 11/2016 | |
| WO | 2018024654 A1 | 2/2018 | |
| WO | 2018217198 A1 | 11/2018 | |
| WO | 2018218033 A2 | 11/2018 | |
| WO | 2019069992 A1 | 4/2019 | |

OTHER PUBLICATIONS

"Back-End Value Enhanced through Patented Technology and Strategic Partnerships" retrieved from WWW.Valicor.com, (5 pages).
"Micro-fine silica treated with an organic silicone compound", DUMACIL® 100 FGK, Elementis Specialities, Apr. 2017, 1 page.
"Micro-fine silica treated with an organic silicone compound", DUMACIL® 300 FGK, Elementis Specialities, Apr. 2017, 1 page.
"Standard Test Method for Foaming Properties of Surface-Active Agenst1", Designation: D 1173-53, Reapproved 2001, 2 pages.
Abdulkadir, M. et al., "Production and Refining of Corn Oil from Hominy Feed a By-Product of Dehulling Operation", ARPN Journal of Engineering an Applied Sciences, vol. 6, No. 4, Apr. 2017, 7 pages.
Friedrich, J.P. et al., "Properties and Processing of Corn Oils Obtained by Extraction With Supercritical Carbon Dioxide", JAOCS, vol. 61, No. 12, 1984, (3 pages).
International Search Report, for International Application No. PCT/US2019/017286, mailed May 14, 2019 (6 pages).
Japir, Abd Al-Wali er al., "Separation of Free Fatty Acids from High Free Fatty Acid Crude Palm Oil Using Short-Path Distillation", The 2016 UKM FST Postgraduate Colloquium, AIP Conf. Proc. 1784, 030001-1-030001-8, 2016, (9 pages).
LCI Corporation, "Short Path Evaporation", retrieved from https://lcicorp.com/short_path_evaporators/short_path_evaporator, (2 pages).
Saini, Ramesh Kumar et al., "Carotenoid extraction methods: A review of recent developments", Food Chemistry, No. 240, pp. 90-103, 2018, (14 pages).
Skaliotis, Leon, "Short Path to Premium Quality Oils," Food Marketing & Technology, Feb. 2011, pp. 23-26, (4 pages).
"Standard Test Method for Foaming Properties of Surface-Active Agents1", Designation: D 1173-53, Reapproved J001, 2 pages.
"Defoamer", Retrieved from 'https://en.wikipedia.org/wiki/Defoamer' on May 30, 2019, 5 pages.
"Micro-fine silica treated with an organic silicone compound", DUMACIL® 100 FGK, Elementis Specialities, Apr. 2017, 1 page.
Abdulkadir et al., "Production and Refining of Corn Oil from Hominy Feed a By-Product of Dehulling Operation", ARPN Journal of Engineering and Applied Sciences, vol. 6, No. 4, Apr. 2011, 7 pages.
"Corn Oil", Retrieved from 'https://corn.org/resources/?fwp_resource_type=pdf&fwp_search=Corn%20Oil', 2006, 24 pages.
International Search Report for International Application No. PCT/US2019/036578, mailed on Oct. 11, 2019, 5 pages.

* cited by examiner

US 12,502,625 B1

HOMOGENOUS EMULSION FROM A GRAIN MATERIAL FERMENTATION

TECHNICAL FIELD

The present disclosure relates to stable and homogeneous emulsions obtained from a grain material fermentation byproduct.

BACKGROUND

Ethanol bio-refineries typically produce fuel-grade ethanol using a fermentation-based process. Much of the ethanol used for transportation fuel in the United States is produced from the fermentation of corn. In an exemplary dry-grind ethanol production process, a vegetable such as corn is delivered to a bio-refinery and its particle size can be reduced by grinding the corn in a dry milling step. The resulting corn flour can then be combined with water, nutrients, enzymes, yeast, and/or other ingredients in a fermenter. Enzymes convert starch into fermentable sugars. Yeast converts fermentable sugars into ethanol. Fermentation results in a beer stream that includes, e.g., ethanol, water, suspended solids, dissolved solids, and corn oil. The beer stream is processed by a distillation unit where ethanol is removed. The stream from the distillation unit after ethanol has been recovered is referred to as whole stillage. This whole stillage stream includes, e.g., suspended solids, dissolved solids, water, and corn oil. The whole stillage stream is separated, typically by decanting centrifuges, into a thin stillage stream and a wet cake stream. The wet cake stream has a higher concentration of solids than whole stillage and is typically of a relatively high viscosity sludge-like consistency. The thin stillage has a lower concentration of suspended solids than whole stillage and is typically of a relatively low viscosity liquid stream. The solids concentration of the thin stillage stream can be increased in an evaporation step where water is evaporated from the thin stillage. Concentrated thin stillage is referred to as syrup in the art. The syrup stream contains an increased concentration of corn oil, which can be separated and sold as distiller's corn oil (DCO). Alternatively, corn oil can be separated prior to fermentation, from the beer, from whole stillage, from thin stillage, from wet cake or any other corn oil containing process stream.

Bio-refineries may separate DCO from process streams using centrifuges to produce a corn oil product. For example, U.S. Pat. No. 9,061,987 (Bootsma), U.S. Pat. No. 8,702,819 (Bootsma), and U.S. Pat. No. 9,695,449 (Bootsma), describe the separation of DCO using centrifuges, wherein the entireties of said patents are incorporated herein by reference. U.S. Pat. No. 8,008,516 (Cantrell et al.) describes DCO separation from thin stillage, wherein the entirety of said patent is incorporated herein by reference. U.S. Pat. No. 9,896,643 (Redford) reports methods and systems for recovering a desired co-product from a feedstock to ethanol production process, wherein the entirety of said patent is incorporated herein by reference.

While DCO can be a valuable co-product, it is typically sold at commodity prices and used as a feedstock for biodiesel production or as an animal feed ingredient. There is a continuing need for refining grain oils, such as corn oil, and using grain oils for a variety of additional purposes. In some instances, byproducts of grain materials can be further processed to obtain a refined oil phase and/or a heavy emulsion phase where each may be valuable in a variety of applications. For instance, the heavy emulsion phase byproduct may be suitable as a defoamer in some applications. However, prior grain material-based emulsions derived from DCO may be unstable and when stored for an extended time at ambient temperatures may settle and separate into at least two phases.

SUMMARY

Figure 1:
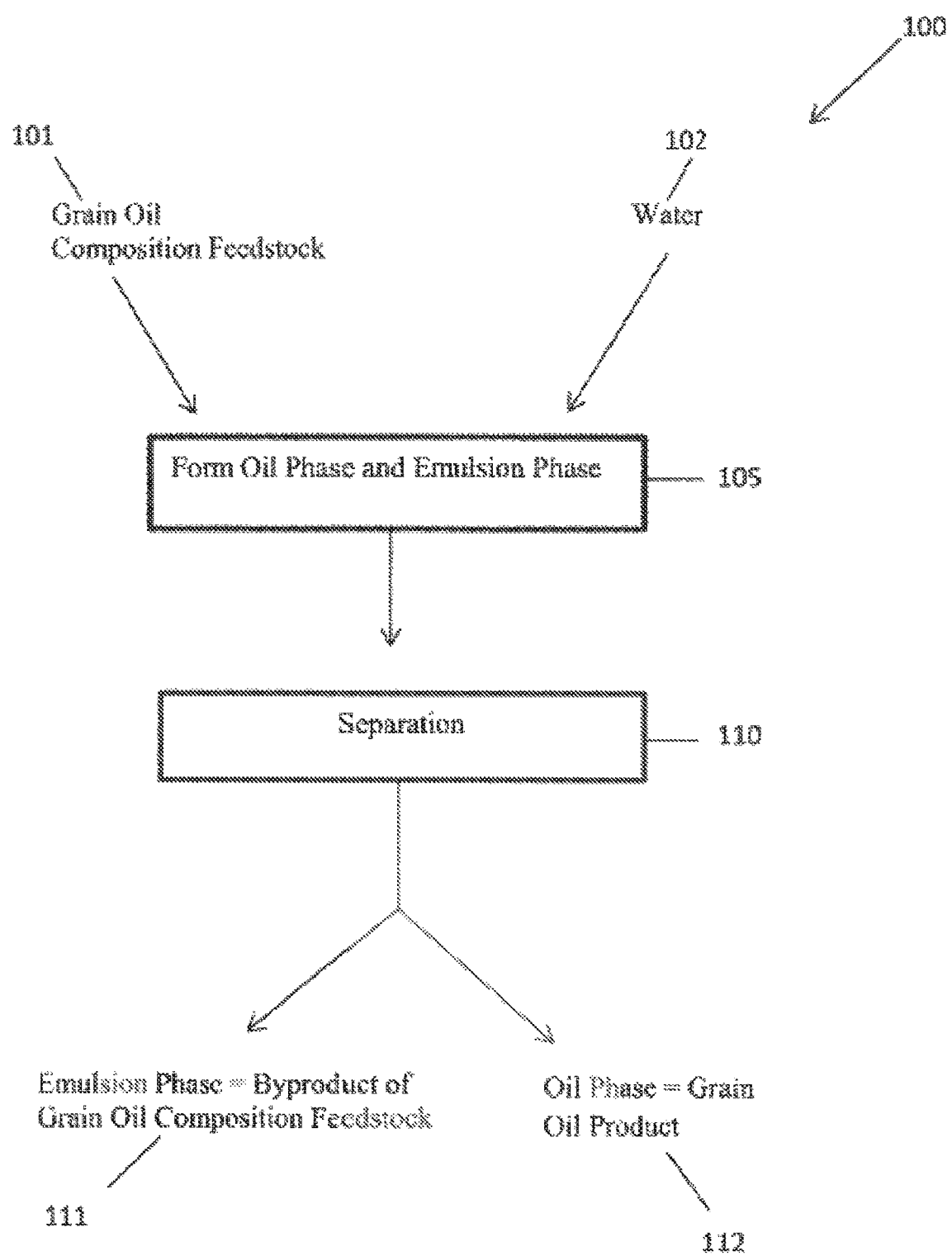
FIG. 1 is a schematic block diagram illustrating an embodiment of refining a grain oil composition feedstock according to the present disclosure.

In one approach or embodiment, a stable and homogenous emulsion obtained from a grain material fermentation is provided herein. In an aspect, the emulsion includes oil and water derived from a grain material fermentation; a soap content of about 500 ppm or greater, wherein the soap content includes a salt of a fatty acid and an alkali or an alkaline-earth metal; and exhibits a Brookfield viscosity of about 100 to about 1,000 cP at 23° C. using spindle 64. In some approaches, the stable and homogeneous emulsion has a pH of about 7 to about 12 and remains a single-phase emulsion for at least about two weeks at about 20° C. to about 25° C.

In other approaches or embodiments, the stable and homogenous emulsion in the previous paragraph may include or be combined with optional features in any combination. Those optional features of the emulsion may include one or more of: wherein the emulsion further comprising water, but no more than about 3 weight percent water; and/or wherein the emulsion has a triglyceride content of about 70 to about 90 weight percent based on the total weight of the emulsion; and/or wherein the emulsion has a weight ratio of soap to total glyceride content of about 1:30 to about 1:400; and/or wherein the emulsion has a free fatty acid content of about 10 weight percent or less based on the total weight of the emulsion; and/or wherein the emulsion has a weight ratio of soap to free fatty acid content of about 1:0.7 to about 1:30; and/or wherein the metals content includes calcium, phosphorus, lithium, sodium, potassium, magnesium, or combinations thereof; and/or wherein the oil is a corn oil; and/or wherein the salt of a fatty acid and an alkali or an alkaline-earth metal includes one or more of sodium oleate, sodium stearate, potassium oleate, potassium stearate, magnesium oleate, magnesium stearate, sodium palmitate, potassium palmitate, magnesium palmitate, sodium linoleate, potassium linoleate, magnesium linoleate, or combinations thereof; and/or wherein the emulsion includes about 2000 ppm to about 100,000 ppm of the soap; and/or wherein the viscosity is about 150 to about 850 cP; and/or wherein the stable and homogeneous emulsion is obtained from an alkali or alkaline metal base treatment of the byproduct of the grain material fermentation; and/or wherein the byproduct of a grain material fermentations is treated with about 0.1 to about 0.27% v/v of a solution of the alkali or alkaline metal base; and/or wherein the byproduct of a grain material fermentation is a stillage composition from the grain material fermentation; and/or wherein the stillage composition includes whole stillage, thin stillage, wet cake, syrup, or combinations thereof; and/or wherein the grain material is corn, barley, rice, wheat, soybean, rapeseed, rye, or combinations thereof.

In yet another approach or embodiment, a method of separating and stabilizing a grain oil composition to provide a homogenous emulsion is provided. In aspects, the method includes combining a grain oil composition with water to form an oil and water mixture (such as an oil-in-water mixture or emulsion); exposing the oil and water mixture to a temperature and for a time effective for the oil and water mixture to form at least an oil phase and an emulsion phase; separating at least a portion of the oil phase from the emulsion phase to form a heavy emulsion phase; and treating the heavy emulsion phase with an alkali or alkaline metal base to form the homogeneous emulsion.

In other approaches or embodiments, the methods in the previous paragraph may include or be combined with optional features in any combination. Those optional features of the methods may include one or more of: wherein the temperature of the heavy emulsion phase during the treating is about 0° C. to about 50° C.; and/or wherein the heavy emulsion phase is treated with about 0.1 to about 0.27% v/v of a solution of the alkali or alkaline metal base; and/or wherein the homogeneous emulsion has a pH of about 7 to about 12; and/or wherein the homogeneous emulsion is further dehydrated to form a dehydrated homogenous emulsion having water, but no more than about 3 weight percent water; and/or wherein the homogeneous emulsion has a soap content of about 500 ppm or greater and wherein the soap is a salt of fatty acids with alkali or alkaline-earth metals; and/or wherein the soap content is about 2,000 to about 100,000 ppm; and/or wherein the homogeneous emulsion has a Brookfield viscosity of about 100 to about 1,000 cP at 23° C. and using spindle 64; and/or wherein the homogeneous emulsion maintains a single phase for at least two weeks at about 20° C. to about 25° C.; and/or wherein the grain oil composition is a byproduct of a grain material fermentation; and/or wherein the byproduct of a grain material fermentation is a stillage composition; and/or wherein the stillage composition includes whole stillage, thin stillage, wet cake, syrup, or combinations thereof; and/or wherein the grain material is corn, barley, rice, wheat, soybean, rapeseed, rye, or combinations thereof; and/or wherein the homogeneous emulsion has a triglyceride content of about 70 to about 90 weight percent based on the total weight of the homogenous emulsion; and/or wherein the homogenous emulsion has a weight ratio of soap to total glyceride content of about 1:30 to about 1:400; and/or wherein the homogeneous emulsion has a free fatty acid content of about 10 weight percent or less based on the total weight of the homogenous emulsion; and/or wherein the homogenous emulsion has a weight ratio of soap to free fatty acid content of about 1:0.7 to about 1:30.

DETAILED DESCRIPTION

The present disclosure involves grain oil compositions and byproducts thereof. As used herein, a "grain oil composition" refers to one or more compositions that can be used as a feedstock for the water refining process according to the present disclosure and one or more product compositions that have been refined according to the present disclosure. For example, a grain oil composition a grain oil composition feedstock such as distiller's corn oil that is refined according to the present disclosure and a grain oil product produced thereby. In some embodiments, a grain oil composition can include a triglyceride component in an amount of at least 70 percent by weight of the grain oil composition, at least 80 percent by weight of the total grain oil composition, at least 90 percent by weight of the total grain oil composition, or even at least 90 percent by weight of the total grain oil composition. A grain oil composition can also include a diglyceride component and/or monoglyceride component. In some embodiments, a grain oil composition can be derived from a fermentation product that has been produced via fermentation of a grain material. In some embodiments, a grain oil composition can include oil derived from oleaginous microorganisms.

As used herein, a "byproduct of a grain oil composition" (or a byproduct of a grain material fermentation) refers to fractions or phases that are separated from a grain oil composition feedstock to form a grain oil product. As described herein below, non-limiting examples of a byproduct of a grain oil composition include an emulsion phase, a dehydrated emulsion phase product, an aqueous phase, and/or a stabilized or homogeneous emulsion phase. While one or more of these byproducts may include high levels of one or more triglycerides, diglycerides, and monoglycerides, they are byproducts of the refining process described herein. In some embodiments, a byproduct of a grain oil composition can have a triglyceride component present in an amount from 0 to 70 percent by weight of the total byproduct of a grain oil composition, or even from 5 to 50 percent by weight of the total byproduct of a grain oil composition.

As mentioned, the present disclosure includes embodiments of methods and systems for refining a grain oil composition feedstock to form a grain oil product. A method of refining a grain oil composition feedstock to provide a grain oil product includes providing a source of a grain oil composition feedstock. In other embodiments, the methods and systems herein form stable and/or homogeneous emulsions including an oil phase derived from a grain material fermentation byproduct. In approaches, the stable and/or homogeneous emulsions remain a single phase emulsion for at least about 2 weeks at ambient temperatures such as about 20° C. to 25° C.

A variety of grains (some of which may also be referred to as vegetables) can be used to provide a grain oil composition (and by-products thereof) such as one or more of corn, sorghum, wheat, rice, barley, soybean, rapeseed, oats, millet, rye and the like. In one approach, the grain is corn.

The grain oil composition feedstock suitable for the compositions and methods herein includes at least a triglyceride component having one or more triglycerides. In some embodiments, the triglyceride component of the feedstock can be present in an amount of at least 70 percent by weight of the total grain oil composition feedstock, at least 80 percent by weight of the total grain oil composition feedstock, at least 90 percent by weight of the total grain oil composition feedstock, or even at least 95 percent by weight of the total grain oil composition feedstock. In some embodiments, the triglyceride component can be present in an amount from 70 to 99 percent by weight of the total grain oil composition feedstock, from 70 to 99 percent by weight of the total grain oil composition feedstock, from 80 to 95 percent by weight of the total grain oil composition feedstock, or even from 85 to 95 percent by weight of the total grain oil composition feedstock. Triglycerides can be determined by test method AOCS Cd 11d-96, which is incorporated herein by reference.

In some embodiments, the grain oil composition feedstock includes a diglyceride component having one or more diglycerides. In some embodiments, the diglyceride component of the feedstock can be present in an amount of 30 percent or less by weight of the total grain oil composition feedstock, 20 percent or less by weight of the total grain oil composition feedstock, 10 percent or less by weight of the total grain oil composition feedstock, or even 5 percent or less by weight of the total grain oil composition feedstock. In some embodiments, the diglyceride component can be present in an amount from 1 to 20 percent by weight of the total grain oil composition feedstock, from 1 to 15 percent by weight of the total grain oil composition feedstock, from 1 to 10 percent by weight of the total grain oil composition feedstock, or even from 1 to 5 percent by weight of the total grain oil composition feedstock. Diglycerides can be determined by test method AOCS Cd 11d-96.

In some embodiments, the grain oil composition feedstock includes a monoglyceride component having one or more monoglycerides. In some embodiments, the monoglyceride component of the feedstock can be present in an amount of 20 percent or less by weight of the total grain oil composition feedstock, 15 percent or less by weight of the total grain oil composition feedstock, 10 percent or less by weight of the total grain oil composition feedstock, or even 5 percent or less by weight of the total grain oil composition feedstock. In some embodiments, the monoglyceride component can be present in an amount from 1 to 15 percent by weight of the total grain oil composition feedstock, from 1 to 10 percent by weight of the total grain oil composition feedstock, from 1 to 5 percent by weight of the total grain oil composition feedstock, or even from 0.1 to 5 percent by weight of the total grain oil composition feedstock. Monoglycerides can be determined by test method AOCS Cd 11d-96.

In some embodiments, the grain oil composition feedstock includes a moisture content of 30 percent or less by weight of the total grain oil composition feedstock, 20 percent or less by weight of the total grain oil composition feedstock, 10 percent or less by weight of the total grain oil composition feedstock, 5 percent or less by weight of the total grain oil composition feedstock, or even 1 percent or less by weight of the total grain oil composition feedstock. In some embodiments, the moisture content can be from 0.01 to 10 percent by weight of the total grain oil composition feedstock, from 0.01 to 5 percent by weight of the total grain oil composition feedstock, from 0.01 to 1 percent by weight of the total grain oil composition feedstock, or even from 0.1 to 1 percent by weight of the total grain oil composition feedstock. Moisture content can be determined by a Karl Fischer titration (e.g., following ASTM E1064-12 or AOCS 2e-84, which are both incorporated herein by reference).

The grain oil composition feedstock also includes an impurity component. As discussed below, the present disclosure includes methods and systems for removing at least a portion of the impurity component from the grain oil composition feedstock to produce a grain oil product having relatively higher purity, which can be more valuable. Depending on the intended use for the oil composition, one or more impurities can have an impact on one or more of oil color, catalyst fouling/inhibition (e.g., while forming biodiesel or renewable diesel from a grain oil composition feedstock), taste, smell, appearance, storage, and compatibility with further processing, materials and conditions to an undue degree. Accordingly, it may be desirable to remove one or more of these components. Nonlimiting examples of impurities include phospholipids, metals, free fatty acids, esters, soaps, gums, waxes, phosphatides, sterols, odiferous volatiles, colorants, and combinations thereof.

In some embodiments, grain oil composition feedstock includes an impurity component that includes at least an element component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951.

In some embodiments, the grain oil composition feedstock includes the element component in an amount of 100 parts per million (ppm) or more based on the total grain oil composition feedstock, 200 ppm or more based on the total grain oil composition feedstock, 500 ppm or more based on the total grain oil composition feedstock, 1000 ppm or more based on the total grain oil composition feedstock, or even 5000 ppm or more based on the total grain oil composition feedstock. In some embodiments, the element component can be from 5 to 10,000 ppm based on the total grain oil composition feedstock, from 100 to 5000 ppm based on the total grain oil composition feedstock, or even from 500 to 1000 ppm based on the total grain oil composition feedstock.

In some embodiments, at least a portion (e.g., including substantially all) of the element component of the grain oil composition feestock is present as soap, which is a salt of the element and a fatty acid such as sodium oleate, magnesium stearate, combinations of these, and the like. In some embodiments, grain oil composition feedstock includes a soap component in an amount from 50 to 30,000 ppm, from 100 to 20,000 ppm, or even from 500 to 10,000 ppm. Soap content can be determined by test method AOCS Cc17-95.

In some embodiments, the grain oil composition feedstock contains no detectable phospholipid. For example, any phospholipid that may have been inherently present in the raw grain material may have been removed in an upstream process.

A grain oil composition feedstock can also include a fatty acid alkyl ester (FAAE) component including one or more fatty acid alkyl esters such as fatty acid ethyl ester (FAEE), which is an esterified (not free) fatty acid. Non-limiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the grain oil composition feedstock, from 0.5 to 20 percent by weight based on the total weight of the grain oil composition feedstock, or from 1 to 15 percent by weight based on the total weight of the grain oil composition feedstock.

A grain oil composition feedstock can also include a free fatty acid component including one or more free fatty acids. In some embodiments, the amount of the one or more free fatty acids is in the range from 0 to 30 percent by weight based on the total weight of the grain oil composition feedstock, from 0.5 to 20 percent by weight based on the total weight of the grain oil composition feedstock, or from 1 to 15 percent by weight based on the total weight of the grain oil composition feedstock. Free fatty acid can be determined by test method AOCS Ca 5a-40.

In some embodiments, a grain oil composition feedstock is derived from a fermentation product, or beer. Fermentation products can be produced by hydrolyzing materials containing sugar polymers and oil to produce a fermentable material containing fermentable sugars and oil and converting the sugars into a fermentation product using an organism capable of fermentation. For example, a grain containing starch and oil may be ground and the starch hydrolyzed into fermentable sugars, e.g., by using one or more enzymes, chemicals, heat, and/or other catalyst. The fermentable sugars may be converted into a target chemical, e.g. an alcohol such as ethanol using an organism, e.g. an ethanologen. The fermentation product can include the target chemical e.g. ethanol, water, oil, additional soluble components, unfermented particulate matter, and the like. The fermentation product can then be distilled to recover the target chemical, e.g. ethanol, leaving the remaining components as whole stillage.

A fermentation product containing oil can be derived from one or more grain materials. A variety of grain materials (some of which may also be referred to as vegetable materials) can be used such as whole ground grain or a fraction of a grain. Grain material can be derived from grain such as corn, sorghum, wheat, rice, barley, soybean, rapeseed, oats, millet, rye or any other grains that that are capable of being fermented and subjected to the refined oil process described herein.

In some embodiments, oil in the fermentation product can also be derived from oleaginous microorganisms. Exemplary oleaginous microorganisms include oleaginous microalgae, which can include the genus *Chlorella* or Prototheca, including, *Chlorella* prothothecoides or Prototheca moriformis, *Nannochloropsis salina, Chlorella vulgaris, Scenedesmus dimorphus,* and Chaetoceros gracilis. Other exemplary oleaginous microorganisms include yeast such as *Yarrowia* hpolytica, *Cryptococcus curvatus*, Rhodosporidium toruloides, and bacteria such as *Rhodococcus opacus*.

Figure 2:
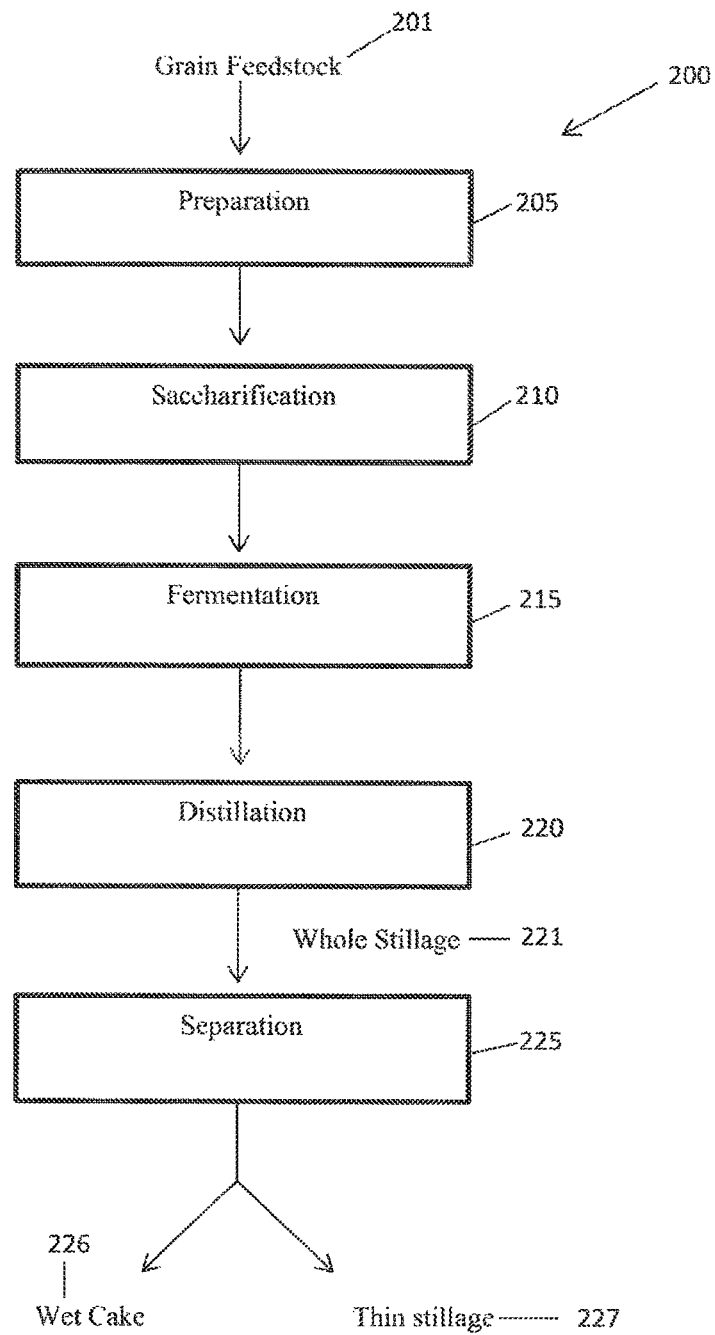
FIG. 2 is a schematic block diagram of an embodiment of processing grain feedstock to form thin stillage and wet cake.

For illustration purposes, a process for obtaining a corn oil composition feedstock from corn grain is described herein. The process includes preparing the corn, saccharifying sugar polymers to obtain fermentable sugars, fermenting the sugars, recovering a corn oil composition feedstock, and refining the corn oil composition feedstock to form a corn oil product. A non-limiting example of providing a corn grain oil composition feedstock for refining according to the present disclosure is illustrated in FIGS. 1 and 2.

Preparation of Grain for Saccharification: As shown in FIG. 2, process 200 includes providing grain feedstock 201, e.g. corn, that is first be prepared 205 for saccharification 210 by reducing the size of the grain. In some embodiments, corn grain can be dry milled (e.g., hammer milled) to produce whole ground corn having a medium-to-fine grind for use in saccharification. In some embodiments, corn grain can be dry-fractionated to separate components of the corn grain (e.g., germ) from each other and then recombine two or more components (e.g., the endosperm and germ) for saccharification.

In some embodiments, the corn grain can be ground so that a substantial portion, e.g., a majority, of the ground corn grain fits through a sieve with a 0.1-5.0 mm screen, or even a 0.1-0.5 mm screen. For example, in an embodiment, about 70% or more, of the ground corn can fit through a sieve with a 0.1-0.5 mm screen.

Ground corn can be mixed with an appropriate amount of water to form an aqueous composition (e.g., a slurry) for subsequent saccharification of the slurry and fermentation of the resulting sugars. In an embodiment, whole ground corn can be mixed with liquid at about 20 to about 50 wt-% or about 25 to about 45 wt-% dry whole ground corn. The whole ground corn can include starch, fiber, protein, oil, endogenous enzymes, amino acids, etc. Any corn grain components (e.g., residual fiber, starch, sugar, oil, etc.) remaining after fermentation can be extracted/separated after fermentation and/or distillation, as discussed below. Because starch constitutes the largest mass portion of the corn grain it can be more efficient to extract other components (e.g., oil, fiber, protein, etc.) after at least a portion of the starch has been removed (i.e., hydrolyzed into glucose which is consumed by, e.g., yeast).

Saccharification: After forming an aqueous slurry that includes the corn material from preparing corn as described above, the aqueous slurry can be subjected to saccharification 210 to break down (hydrolyze) at least a portion of the starch into glucose that can be used by yeast during fermentation. Saccharification can be performed by a variety of techniques. For example, heat and/or one or more enzymes can be used to saccharify components of the prepared corn into oligomers and monomers.

In some embodiments, a relatively low temperature saccharification process involves enzymatically hydrolyzing at least a portion of the starch in the aqueous slurry at a temperature below starch gelatinization temperatures, so that saccharification occurs directly from the raw native insoluble starch to soluble glucose while bypassing conventional starch gelatinization conditions. Starch gelatinization temperatures are typically in a range of 57° C. to 93° C. depending on the starch source and polymer type. Converting raw starch to glucose with one or more exogenous enzymes, e.g., glucoamylase and acid fungal amylase is described in U.S. Pat. No. 7,842,484 (Lewis) and U.S. Pat. No. 7,919,291 (Lewis et al.), wherein the entireties of the patents are incorporated herein by reference. In one embodiment, saccharification includes enzymatically (e.g., with alpha-amylases and gluco-amylases) hydrolyzing at least a portion of the starch in the aqueous slurry at a temperature below 40° C. or less to produce a slurry that includes glucose. In some embodiments, enzymatic hydrolysis occurs at a temperature in the range of from 25° C. to 35° C. to produce a slurry that includes glucose.

In some embodiments, saccharification of starch can include heating the slurry to a temperature in the range from 50° C. to 100° C.; from 60° C. to 90°; or even from 80° C. and 85° C. and adding a thermostable alpha-amylase to the slurry to initiate liquefaction. In some embodiments, saccharification of the starch can include jet-cooking the slurry at a temperature between 100° C. to 145° C. to complete gelatinization of the slurry.

Fermentation: After saccharification, the resulting slurry ("grain mash composition") includes grain solids, grain oil and sugar. The sugar (glucose) that is generated from saccharification can be fermented 215 into one or more biochemicals (e.g., butanol, ethanol, and the like). Systems for producing more than one biochemical from the glucose can be integrated together or be separate. Fermenting can be carried out by microorganisms. Exemplary microorganisms include ethanologens, butanologens, and the like. Exemplary microorganisms include yeasts.

In some embodiments, fermenting can include contacting an aqueous slurry including sugars derived from ground corn with microorganisms under conditions suitable for growth of the microorganims and production of a biochemical. For examples, yeasts may be used that convert the sugars to ethanol. Suitable yeasts include any variety of commercially available yeasts, such as commercial strains of *Saccharomyces cerevisiae*. Optionally, one or more components (e.g., yeast nutrients) can be included in the aqueous slurry that is to be fermented. In other embodiments, saccharification and fermentation can occur simultaneously in the same reactor (also referred to as simultaneous saccharification and fermentation (SSF)). In yet other embodiments, fermenting a grain mash can include fermenting the grain mash in the presence of one or more enzymes (endogenous enzymes and/or exogenous enzymes) to generate one or more fatty acid alkyl esters. Examples of such enzymes include lipase, esterase, and combinations thereof.

Distillation: After fermentation, the biochemical can be removed from the beer in a distillation system 220 to form a whole stillage 221. For example, a beer derived from corn can be distilled to remove ethanol and form whole stillage. For example, heat and/or vacuum may be applied to the fermentation product in a distillation unit to evaporate and condense the biochemical to separate it from the rest of the fermentation product. The bottoms stream from the distillation unit after the biochemical has been recovered is referred to as whole stillage 221. This whole stillage stream 221 includes, e.g., suspended solids, dissolved solids, water, and oil. The whole stillage stream is separated, typically by decanting centrifuges, into a thin stillage stream 227 and a wet cake stream 226.

The wet cake stream 226 is a wet, solid stream e.g. greater than 25% solids w/w. The thin stillage stream 227 is a liquid stream that contains a lower concentration of suspended solids, e.g. less than 15% solids w/w, compared to whole stillage.

Figure 3:
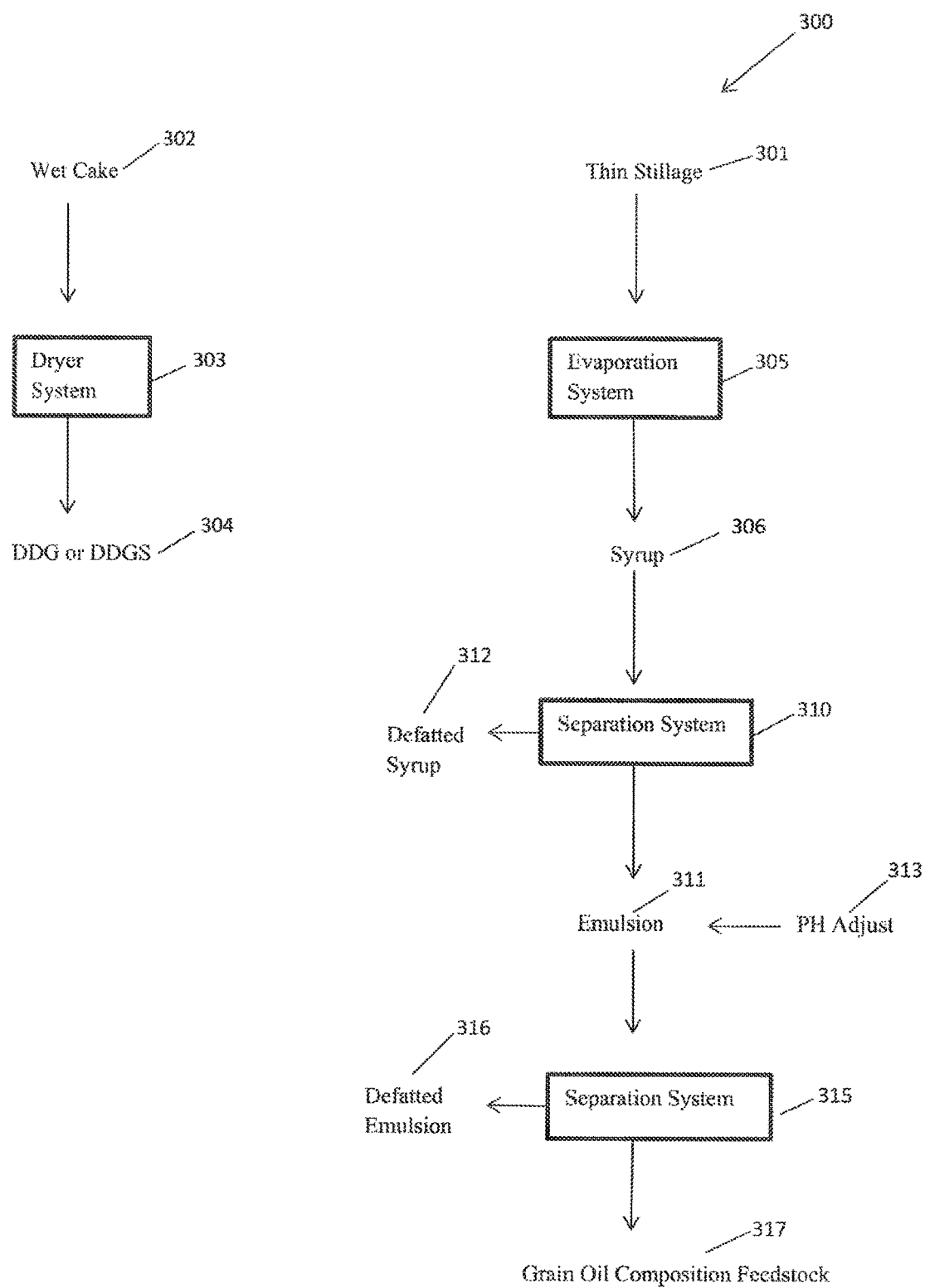
FIG. 3 is a schematic diagram of an embodiment of forming a grain oil composition feedstock from thin stillage.

Referring to the non-limiting, exemplary process flow 300 in FIG. 3, the thin stillage stream 301 and wet cake stream 302 can be further processed as illustrated. The solids concentration of the thin stillage stream can be increased in an evaporation step 305 where water is evaporated from the thin stillage 301. Concentrated thin stillage is referred to as syrup 306 in the art. The syrup stream 306 contains an increased concentration of corn oil, which can be separated as an oil composition and sold as distiller's corn oil (DCO).

In some embodiments, an oil composition can be derived from a fermentation product before distillation. In some embodiments, an oil composition can be derived from a fermentation product after distillation. For example, in some embodiments an oil composition can be derived from a whole stillage composition obtained after distillation of a fermentation product.

The wet cake 302 can be dried in a dryer system 303 to provide "Distillers Dried Grains" (DDG) 304. In some embodiments, a portion of the syrup may be blended into DDG or added to the wet cake before drying to produce Distillers Dried Grain with Solubles (DDGS).

As used herein, "grain stillage composition" is used to refer to whole stillage, thin stillage, wet cake and/or syrup. A grain oil composition feedstock may be derived from the stillage composition.

Referring to FIG. 3, syrup 306 can be processed to provide a grain oil composition feedstock 317 that can be refined with water according to the present disclosure. As shown in FIG. 3, syrup can be separated via separation system 310 into a first oil fraction 311 and a first aqueous fraction 312 (defatted syrup). The first oil fraction 311 can be referred to as distiller's corn oil. In some embodiments, first oil fraction 311 is a grain oil composition feedstock that is refined that is refined with water according to the present disclosure. As shown, if first oil fraction 311 is an emulsion, it can have its pH adjusted (e.g., from 7-9) to break the emulsion into a second oil fraction 317 and a second aqueous fraction 316 (defatted emulsion). In some embodiments, as shown, the second oil fraction 316 is a grain oil composition feedstock that is refined that is refined with water according to the present disclosure. The second oil fraction can also be referred to as distiller's corn oil that is sold under the trade name Voila® corn oil.

Examples of methods of extracting oil from a stillage composition are described at U.S. Pat. No. 9,061,987, (Bootsma), U.S. Pat. No. 8,702,819 (Bootsma), and U.S. Pat. No. 9,695,449 (Bootsma) wherein oil is separated using centrifuges. The entireties of these patents are incorporated herein by reference. U.S. Pat. No. 8,008,516 (Cantrell et al.) describes DCO separation from thin stillage, wherein the entirety of the patent is incorporated herein by reference. U.S. Pat. No. 9,896,643 (Redford) describes recovering a light phase product from ethanol product, wherein the entirety of the patent is incorporated herein by reference.

Optionally, a grain oil composition feedstock can be treated before being refined according to the present disclosure. Non-limiting examples of such treatments include one or more of degumming, adding a flocculating agent to the grain oil composition, adding a filter aid to the grain oil composition.

Combining the Grain Oil Composition Feedstock with Water:

According to the present disclosure, a grain oil composition feedstock as described above may be combined with water to form an oil-water mixture and form an oil phase (grain oil product) and an emulsion phase and so that at least a portion of the impurity component can transfer into the emulsion phase. The methods and products herein advantageously product a relatively more pure grain oil product as compared to the grain oil composition feedstock.

The amount of water combined with the grain oil composition feedstock is selected so that the amount of water in the oil-water mixture is from 5 to 50% based on the total volume of the oil water mixture (v/v). Accordingly, the amount of water can vary, for example, based on the amount of water in the grain oil composition feedstock. In some embodiments, the amount of water in the oil-water mixture is from 10 to 40% based on the total volume of the oil water mixture (v/v), from 10 to 40% based on the total volume of the oil water mixture (v/v), from 5 to 10% based on the total volume of the oil water mixture (v/v), from 8 to 15% based on the total volume of the oil water mixture (v/v), from 10 to 25% based on the total volume of the oil water mixture (v/v), from 20 to 35% based on the total volume of the oil water mixture (v/v), from 25 to 50% based on the total volume of the oil water mixture (v/v), or even from 3 to 50% based on the total volume of the oil water mixture (v/v).

The amount of water added can affect how many layers, or phases, form from the oil-water mixture. In some embodiments, the oil-water mixture forms into at least an oil layer/phase and an emulsion layer/phase. In some embodiments, if a relatively large amount of water is combined with the grain oil composition feedstock, the oil-water mixture can form into three layers/phases. Namely, an oil layer, an emulsion layer and a water layer. In some embodiments, the oil-water mixture forms into a top layer, or light, oil phase and a bottom layer, or heavy, emulsion phase.

Water can be obtained from a variety of sources. Non-limiting examples of water sources include standard tap water, biorefinery distillate, reverse osmosis (RO) reject, RO permeate, de-ionized water, or any other suitable water source. While not being bound by theory, it is believed that with respect to at least some impurities adding water can provide a concentration gradient to facilitate transferring one or more impurities into an emulsion phase so that they can be sequestered from the oil phase. Not wishing to be bound by theory, it is believed that the addition of water may also hydrate one or more impurities that are sequestered in an emulsion phase that may be separated from the oil phase that becomes the grain oil product. The term sequestering as used herein refers to the process wherein contaminants are either directly or indirectly (through binding to water molecules) taken up into the emulsion phase.

Optionally, one or more chelating agents can be added to the water to aid in removal of metals and metal compounds from the grain oil composition feedstock. In some embodiments, the metals are calcium, potassium, magnesium, aluminum, iron, and copper. Metal contaminants, especially iron, can darken oil during other processing steps (e.g. deodorizing of oil), and even small amounts of iron that do not affect the oil's color can reduce stability of refined oil. Exemplary chelating agents include ethylenediaminetetraacetic acid (EDTA). Commercially available EDTA is sold as VERSENE 100 (Dow Chemical). It is envisioned that any suitable chelating agent could be used.

FIG. 1 is a schematic block diagram illustrating an embodiment 100 of refining a grain oil composition feedstock according to the present disclosure. As shown, a source of grain oil composition feedstock 101 and a source of water 102 are combined in a system 105 to form an emulsion phase and an oil phase.

A wide variety of systems and apparatuses can be used to combine and mix the grain oil composition feedstock 101 and source of water 102. One or more mixing/agitation apparatuses can be combined in series and/or in parallel. Non-limiting examples include one or more static mixers (e.g., inline static mixers), impeller mixers, pumps, shear mixers, tank recirculation loops, tank mixers (e.g., continuously stirred tank reactors), and combinations thereof (e.g., in series), or other mixers able to disperse the water in the grain oil composition and promote thorough mixing. In some embodiments, a grain oil composition feedstock stream 101 and a water stream 102 can be piped to combine in a common pipe and mix together.

A wide variety of conditions can be used to form an emulsion phase and an oil phase. For example, the oil-water mixture is exposed to a temperature in the range from 0° C. to 50° C. for a time period at least until the oil-water mixture forms at least an oil phase and an emulsion phase. In some embodiments, the oil-water mixture is exposed to a temperature in the range from 5° C. to 35° C., 10° C. to 30° C., 15° C. to 25° C., or even from 20° C. to 30° C. In some embodiments, the oil-water mixture is at a temperature in the range from 0° C. to 5° C., or 0° C. to 10° C. In some embodiments, the oil and water are mixed in a refrigerated vessel that is at 2° C. to 7° C. or from 3° C. to 5° C. temperature for 30 minutes to 5 hours. In some embodiments, oil-water mixture is simply allowed to cool over time to e.g., 10° C. to 40° C.

In some embodiments, the two phases can be cooled (e.g., about 4° C.) in a container so that the heavy phase fraction forms a solid. The liquid light phase fraction can then be easily separated from the heavy phase fraction. Additionally, the corn oil in FIG. 1 may be treated prior to separation. Treatment methods may include degumming, adding a flocculating agent to the corn oil, adding a filter aid to the corn oil, or a combination of these methods. It is recognized that the separation process in FIG. 1 may be suitable for separating other vegetable oils. Also, an as-is distiller's corn oil can be combined with an amount of water prior to separating into a light phase fraction and heavy phase fraction. It was discovered that combining, e.g., 20% w/w of water with as-is distiller's corn oil prior to separation resulting in a heavy phase fraction that was a bright yellow, homogenous emulsion.

Figure 4:
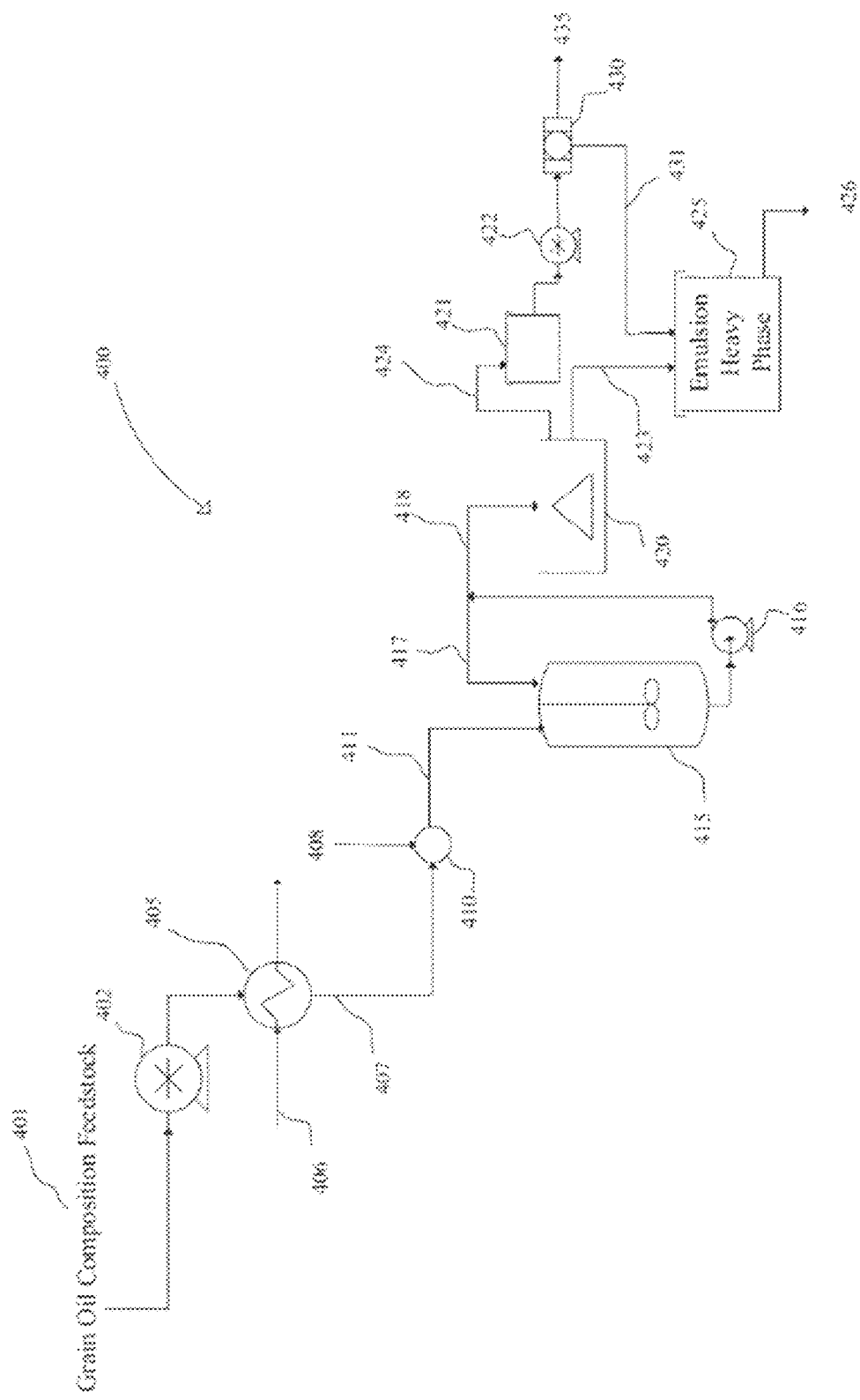
FIG. 4 is a schematic process flow diagram illustrating an embodiment of refining a grain oil composition feedstock according to the present disclosure.

FIG. 4 is a schematic process flow diagram illustrating a more detailed embodiment of refining a grain oil composition feedstock according to the present disclosure. As shown in FIG. 4, the grain oil composition feedstock 401 can be relatively hot or cool before it is combined with water to form an emulsion according to the present disclosure. For example the grain oil composition feedstock 401 can be at a temperature greater than 50° C. (e.g., from 70° C. to 105° C., or even from 70° C. to 95° C.) or less than 0° C. And, for example, if the grain oil composition feedstock is at a temperature above 50° C. (e.g., 90° C.) it may be challenging to the form an emulsion phase. Accordingly, the grain oil composition feedstock 401 can be cooled or heated so that it is at a temperature in the range from 0° C. to 50° C. A variety of heating or cooling techniques can be used. For example, the temperature of the grain oil composition feedstock 401 can be adjusted (heated or cooled) by using a heat exchanger and/or by mixing the grain oil composition feedstock 401 with an appropriate amount of water at an appropriate temperature.

As shown in FIG. 4, the grain oil composition feedstock 401 is pumped via pump 402 through a heat exchanger 405 that utilizes a heat transfer medium 406 (e.g., water) to adjust the temperature of the grain oil composition feedstock 401. Heat exchanger 405 may be a plate and frame heat exchanger, a shell and tube heat exchanger, or some other heat exchanger that is suitable for cooling or heating a grain oil stream. The heat exchange fluid 406 that is used to transfer heat may be process water at a biorefinery. If colder temperatures are desired, the heat exchange fluid may be chilled glycol or a different heat exchange fluid. As shown, water 408 is combined with the temperature adjusted grain oil composition feedstock 407, e.g., via mixing device 410. The temperature of the grain oil composition feedstock 401

(if heat exchanger 405 is omitted) or the temperature adjusted grain oil composition feedstock 407 may be adjusted (heated or cooled) by the temperature of the water 408 that is combined with it in the mixing device 410 (e.g., an inline static mixer) to form an oil-water mixture 411 at a temperature in the range from 0° C. to 50° C. In some embodiments, the temperature of the oil-water mixture 411 is from 0° C. to 50° C. by adding water 408 that is at a temperature of 10° C. to 40° C. In some embodiments the temperature adjusted grain oil composition feedstock 407 may be cooled (e.g. to less than 30° C.) before adding the water 408. In still other embodiments, the temperature of the oil-water mixture 411 once formed may be further adjusted (e.g., cooled). Although not shown, water stream 408 or an additional water stream could be combined with the grain oil composition feedstock 401 and/or the temperature adjusted grain oil composition feedstock 407 directly in mixing tank 415.

As shown, the oil-water mixture can be further agitated to facilitate forming an oil phase and an emulsion phase so that at least a portion of the impurity component is sequestered in the emulsion phase. As shown in the illustrative example of FIG. 4, the oil-water mixture 411 is fed into tank mixer 415, wherein it is mixed using mixing impellers and is recirculated via pump 416 and recirculation line 417.

Forming an oil phase and emulsion phase as described herein can be performed in a continuous or batch manner. In some embodiments, when the process is carried out as a batch process, the grain oil composition feedstock and water can be introduced sequentially or simultaneously and in any order. If the oil-water mixture is agitated and then allowed to settle it will form layers. In some embodiments when the process is carried out as a continuous process, inline static mixer 410 can instead be an intersection of piping where grain oil composition feedstock and water are introduced simultaneously and then subsequently mixed by a mixing device, such as a static mixer.

The oil-water mixture can be mixed for a time period to form the oil phase and emulsion phase and permit at least a portion of the impurity component to be sequestered in the emulsion phase. Mixing parameters are selected according to the mechanical design of the mixer. Mixing may be performed from a period of fractions of a second to hours, e.g., from 5 minutes to 5 hours. Mixing may occur in a continuous flow mixing vessel. If so, adjusting the volume of the continuous flow reactor will adjust the mean residence time of the oil-water mixture in the reactor, thereby controlling the length of the mixing period; e.g. for a given flow through rate, a larger reactor vessel will provide a longer mean residence period.

Recovering the Oil Phase from the Emulsion Phase

As shown in FIG. 1, after forming the emulsion phase and the oil phase, at least a portion of the oil phase can be separated and recovered 110 from the emulsion phase 111 to form a grain oil product 112. The emulsion phase 111 can also be referred to as a by-product of the grain oil composition feedstock 101. A wide variety of systems and devices can be used to separate at least a portion of the emulsion phase from the oil phase. Because the oil phase has a bulk density that is less than the bulk density of the emulsion phase, separation techniques based on density differences can be used. In some embodiments, separation is accomplished by allowing gravity phase separation to occur over time using a settling tank and/or a cooled settling tank, followed by decanting the oil phase layer. In some embodiments separation is accomplished more quickly by centrifugation. These and other methods may be combined. Centrifugation can be by, for example, a decanter centrifuge, a disk stack centrifuge, a cooled disk stack centrifuge, a screen centrifuge, hydrocyclone or a combination thereof. The speed or amount of centrifugal force applied can depend on various factors such as sample size and may be adjusted appropriately depending on such factors. For example, centrifugation may be carried out at 4,200 rpm. In some embodiments, centrifugation is carried out at 4,200 rpm, for 20 minutes and at 27° C. Non-limiting examples of other apparatuses that can be used to separate an emulsion phase from an oil phase include a filter press, a rotary drum filter, or some other apparatus that is suitable to separate a liquid stream based on density differences.

Referring to the illustrative example of FIG. 4, the oil water mixture 418 is passed through a centrifuge 420 to separate emulsion (heavy phase) 423 from the oil phase (light phase) 424.

After isolating a grain oil product (light phase fraction) and an emulsion phase (heavy phase fraction), the grain oil product and/or the emulsion phase can be filtered to remove solid particles and/or waxy particles. Waxy particles refer to particles that may settle out at a given temperature (e.g., 21° C.). As shown in FIG. 4, the oil phase 424 can be transferred to a surge tank (collection tank) 421. The pressure of the light phase 424 leaving the centrifuge 420 may not be high enough to pass through downstream equipment. Surge tank 421 and pump 422 facilitate pumping light phase 424 downstream. Also, surge tank 421 and pump 422 can help provide a consistent flow rate, for example, when the flow of light phase 424 from centrifuge 420 experiences fluctuations. As shown, light phase 424 is pumped through one or more filter apparatuses 430 in series or parallel to remove at least a portion of solids, waxy particles, soaps, metals, and combinations thereof from the oil phase 424 and form a final grain oil product 435. Nonlimiting examples of filter apparatuses include a filter press, a cylindrical cartridge filter, a pleated cartridge filter, a sock filter, and combinations thereof. In some embodiments, a filter's nominal micrometer rating may be 1, 2, 3, 4, 5, 6, 7, 8, 9, or even 10 microns.

As shown, depending on the end use, any solids, waxy particles, soaps, metals, and combinations thereof that are separated from the oil phase 424 can be transferred via stream 431 and combined with the emulsion phase 423 in one or more tanks 425 and form an emulsion product 426.

According to the present disclosure, an amount of the impurity component in the emulsion phase is greater than an amount of the impurity component in the grain oil product. In some embodiments, at least 50 percent by weight of the impurity component in the grain oil feedstock composition is present in the emulsion phase, at least 60 percent by weight of the impurity component in the grain oil feedstock composition is present in the emulsion phase, at least 70 percent by weight of the impurity component in the grain oil feedstock composition is present in the emulsion phase, at least 80 percent by weight of the impurity component in the grain oil feedstock composition is present in the emulsion phase, at least 90 percent by weight of the impurity component in the grain oil feedstock composition is present in the emulsion phase, or even at least 95 percent by weight of the impurity component in the grain oil feedstock composition is present in the emulsion phase.

Oil Phase

As mentioned, the oil phase can be a final grain oil product or can be further treated (see below) to become a final grain oil product. Because of the water refining process described herein, the grain oil product can be referred to as "refined" because it can have a relatively higher triglyceride content and relatively less impurity component than was present in the grain oil composition feedstock and/or that is present in the emulsion phase (and/or optional aqueous, third phase/layer). In some embodiments, the grain oil product passes visual inspection as being clear and bright after 48 hr. incubation at 0° C. In some embodiments, the oil yield achieved by the described refining process is at least 60 percent of the starting grain oil feedstock composition, at least 70 percent of the starting grain oil feedstock composition, at least 80 percent of the starting grain oil feedstock composition, or even at least 90 percent of the starting grain oil feedstock composition.

As mentioned, the grain oil product includes at least a triglyceride component having one or more triglycerides. The amount of the triglyceride component in the grain oil product can depend on, e.g., the amount present in the grain oil feedstock composition. In some embodiments, the triglyceride component can be present in an amount of at least 70 percent by weight of the total grain oil product, at least 80 percent by weight of the total grain oil product, at least 90 percent by weight of the total grain oil product or even at least 95 percent by weight of the total grain oil product. In some embodiments, the triglyceride component can be present in an amount from 70 to 99 percent by weight of the total grain oil product, from 75 to 95 percent by weight of the total grain oil product, from 80 to 95 percent by weight of the total grain oil product, or even from 85 to 95 percent by weight of the total grain oil product. Triglycerides can be determined by test method AOCS Cd 11d-96.

In some embodiments, the grain oil product includes a diglyceride component having one or more diglycerides. The amount of the diglyceride component in the grain oil product can depend on, e.g., the amount present in the grain oil feedstock composition. In some embodiments, the diglyceride component can be present in an amount of 30 percent or less by weight of the total grain oil product, 20 percent or less by weight of the total grain oil product, 10 percent or less by weight of the total grain oil product, or even 5 percent or less by weight of the total grain oil product. In some embodiments, the diglyceride component can be present in an amount from 1 to 20 percent by weight of the total grain oil product, from 1 to 15 percent by weight of the total grain oil product, from 1 to 10 percent by weight of the total grain oil product, or even from 1 to 5 percent by weight of the total grain oil product. Diglycerides can be determined by test method AOCS Cd 11d-96.

In some embodiments, the grain oil product includes a monoglyceride component having one or more monoglycerides. The amount of the monoglyceride component in the grain oil product can depend on, e.g., the amount present in the grain oil feedstock composition. In some embodiments, the monoglyceride component can be present in an amount of 20 percent or less by weight of the total grain oil product, 15 percent or less by weight of the total grain oil product, 10 percent or less by weight of the total grain oil product, or even 5 percent or less by weight of the total grain oil product. In some embodiments, the monoglyceride component can be present in an amount from 1 to 15 percent by weight of the total grain oil product, from 1 to 10 percent by weight of the total grain oil product, from 1 to 5 percent by weight of the total grain oil product, or even from 0.1 to 5 percent by weight of the total grain oil product. Monoglycerides can be determined by test method AOCS Cd 11d-96.

The moisture content in the grain oil product can depend on, e.g., the moisture content present in the grain oil feedstock composition. In some embodiments, the grain oil product includes a moisture content of 20 percent or less by weight of the total grain oil product, 10 percent or less by weight of the total grain oil product, 5 percent or less by weight of the total grain oil product, 1 percent or less by weight of the total grain oil product, or even 0.5 percent or less by weight of the total grain oil product. In some embodiments, the moisture content can be from 0.01 to 5 percent by weight of the total grain oil product, from 0.01 to 1 percent by weight of the total grain oil product, from 0.01 to 0.5 percent by weight of the total grain oil product, or even from 0.1 to 0.5 percent by weight of the total grain oil product. Moisture content can be determined by a Karl Fischer titration (e.g., following ASTM E1064-12 or AOCS 2e-84).

In some embodiments, the grain oil product may include some to the impurity component that was present in the grain oil composition feedstock. As discussed herein, in some embodiments it is desirable to perform the refining process described herein to sequester as much of the impurity component in the grain oil composition feedstock in the emulsion phase as possible. In some embodiments, the grain oil product includes an impurity component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951. In some embodiments, the grain oil product includes the element component in an amount of 500 parts per million (ppm) or less based on the total grain oil product, 200 ppm or less based on the total grain oil product, 100 ppm or less based on the total grain oil product, 50 ppm or less based on the total grain oil product, or even 25 ppm or less based on the total grain oil product. In some embodiments, the grain oil product includes the element component in an amount from about 0 to 100 ppm, from 0 to 50 ppm, 0 to 10 ppm, 5 to 20 ppm, 10 to 30 ppm, 25 to 50 ppm, 35 to 60 ppm, 45 to 75 ppm, 50 to 75 ppm, or even 75 to 100 ppm.

In some embodiments, at least a portion (e.g., including substantially all) of the element component is present as soap, which is a salt of the element and a fatty acid such as sodium oleate, magnesium stearate, combinations of these, and the like. In some embodiments, grain oil product includes a soap component in an amount from 0 to 500 ppm, from 0 to 100 ppm, or even from 0 to 50 ppm. Soap content can be determined by test method AOCS Cc17-95.

In some embodiments, the grain oil product contains no detectable phospholipid. For example, any phospholipid that may have been inherently present in the raw grain material may have been removed in an upstream process.

A grain oil product can also include a fatty acid alkyl ester (FAAE) component including one or more fatty acid alkyl esters such as fatty acid ethyl ester (FAEE), which is an esterified (not free) fatty acid. Nonlimiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the grain oil product, from 0.5 to 20 percent by weight based on the total weight of the grain oil product, or from 1 to 15 percent by weight based on the total weight of the grain oil product.

A grain oil product can also include a free fatty acid component including one or more free fatty acids. In some embodiments, the amount of the one or more free fatty acids is in the range from 0 to 10 percent by weight based on the total weight of the grain oil product, from 0.5 to 5 percent by weight based on the total weight of the grain oil product, or from 0.5 to 2 percent by weight based on the total weight of the grain oil product. Free fatty acid can be determined by test method AOCS Ca 5a-40.

The Emulsion Phase:

The emulsion phase can be a final emulsion product or can be further treated (see below) to become a final emulsion product or a stable and/or homogeneous final emulsion product. Because of the water refining process described herein, the emulsion phase can have relatively more impurity component than was present in the grain oil composition feedstock and/or that is present in the grain oil product.

The emulsion phase may include at least a triglyceride component having one or more triglycerides. The amount of the triglyceride component in the emulsion phase can depend on, e.g., the amount present in the grain oil feedstock composition and the yield in the grain oil product. In some embodiments, the triglyceride component can be present in an amount of 80 percent or less by weight of the total emulsion phase, 70 percent or less by weight of the total emulsion phase, 60 percent or less by weight of the total emulsion phase, or even 50 percent or less by weight of the total emulsion phase. In some embodiments, the triglyceride component can be present in an amount from 0 to 70 percent by weight of the total emulsion phase, from 5 to 50 percent by weight of the total emulsion phase, from 10 to 40 percent by weight of the total emulsion phase, or even from 15 to 30 percent by weight of the total emulsion phase. Triglycerides can be determined by test method AOCS Cd 11d-96.

In some embodiments, the emulsion phase includes a diglyceride component having one or more diglycerides. The amount of the diglyceride component in the emulsion phase can depend on, e.g., the amount present in the grain oil feedstock composition. In some embodiments, the diglyceride component can be present in an amount of 10 percent or less by weight of the total emulsion phase, 5 percent or less by weight of the total emulsion phase, or even 1 percent or less by weight of the total emulsion phase. Diglycerides can be determined by test method AOCS Cd 11d-96. In some embodiments, the emulsion phase includes a monoglyceride component having one or more monoglycerides. The amount of the monoglyceride component in the emulsion phase can depend on, e.g., the amount present in the grain oil feedstock composition. In some embodiments, the monoglyceride component can be present in an amount of 10 percent or less by weight of the total emulsion phase, or even 1 percent or less by weight of the total emulsion phase. Monoglycerides can be determined by test method AOCS Cd 11d-96. The moisture content in the emulsion phase can depend on, e.g., the moisture content present in the grain oil feedstock composition and water added to the grain oil composition feedstock. In some embodiments, the emulsion phase includes a moisture content of 20 percent or more by weight of the total emulsion phase, 30 percent or more by weight of the total emulsion phase, 40 percent or more by weight of the total emulsion phase, 50 percent or more by weight of the total emulsion phase, or even 60 percent or more by weight of the total emulsion phase. In some embodiments, the moisture content can be from 20 to 70 percent by weight of the total emulsion phase, from 30 to 65 percent by weight of the total emulsion phase, or even from 35 to 65 percent by weight of the total emulsion phase.

Moisture content can be determined by a Karl Fischer titration (e.g., following ASTM E1064-12 or AOCS 2e-84).

As discussed herein, it can be desirable to perform the refining process described herein to sequester as much of the impurity component in the grain oil composition feedstock in the emulsion phase as possible. In some embodiments, the emulsion phase includes an impurity component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951.

In some embodiments, the emulsion phase includes the element component in an amount of 100 parts per million (ppm) or more based on the total emulsion phase, 200 ppm or more based on the total emulsion phase, 500 ppm or more based on the total emulsion phase, 1000 ppm or more based on the total emulsion phase, or even 10,000 ppm or more based on the total emulsion phase. In some embodiments, the element component can be from 5 to 50,000 ppm based on the total emulsion phase, from 100 to 10,000 ppm based on the total emulsion phase, or even from 1000 to 40,000 ppm based on the total emulsion phase.

In some embodiments, at least a portion (e.g., including substantially all) of the element component is present as soap, which is a salt of the element and a fatty acid such as sodium oleate, magnesium stearate, combinations of these, and the like. In some embodiments, emulsion phase includes a soap component in an amount from 50 to 100,000 ppm, from 100 to 50,000 ppm, or even from 500 to 20,000 ppm. Soap content can be determined by test method AOCS Cc17-95.

In some embodiments, the emulsion phase contains no detectable phospholipid. For example, any phospholipid that may have been inherently present in the raw grain material may have been removed in an upstream process.

An emulsion phase can also include a fatty acid alkyl ester (FAAE) component including one or more fatty acid alkyl esters such as fatty acid ethyl ester (FAEE), which is an esterified (not free) fatty acid. Nonlimiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the emulsion phase, from 0.5 to 20 percent by weight based on the total weight of the emulsion phase, or from 1 to 15 percent by weight based on the total weight of the emulsion phase.

An emulsion phase can also include a free fatty acid component including one or more free fatty acids. In some embodiments, the amount of the one or more free fatty acids is in the range from 0 to 30 percent by weight based on the total weight of the emulsion phase, from 0.5 to 20 percent by weight based on the total weight of the emulsion phase, or from 1 to 15 percent by weight based on the total weight of the emulsion phase. Free fatty acid can be determined by test method AOCS Ca 5a-40.

The emulsion phase may be used as-is, dried to an anhydrous oily emulsion product, or dried and de-oiled to provide a solid emulsion product (e.g., solvent extracted to yield a de-oiled powder). Where the emulsion phase is dried, e.g. by evaporation in an evaporator, the removed water can be recycled for re-use in the refining process. Water recycling results in substantially no discharge water. In embodiments, the water is recycled without the need for treatment. In some embodiments, drying is performed using a wiped film evaporator to minimize heat degradation of the product if degradation is to be minimized.

Drying of the emulsion phase results in a concentrated emulsion product, which may include triglycerides, diglycerides, monoglycerides, free fatty acids, and fatty acid soaps. De-oiling the emulsion product further concentrates the emulsion product. In some embodiments, a dried and de-oiled emulsion comprises primarily soaps in powder form.

Figure 5:
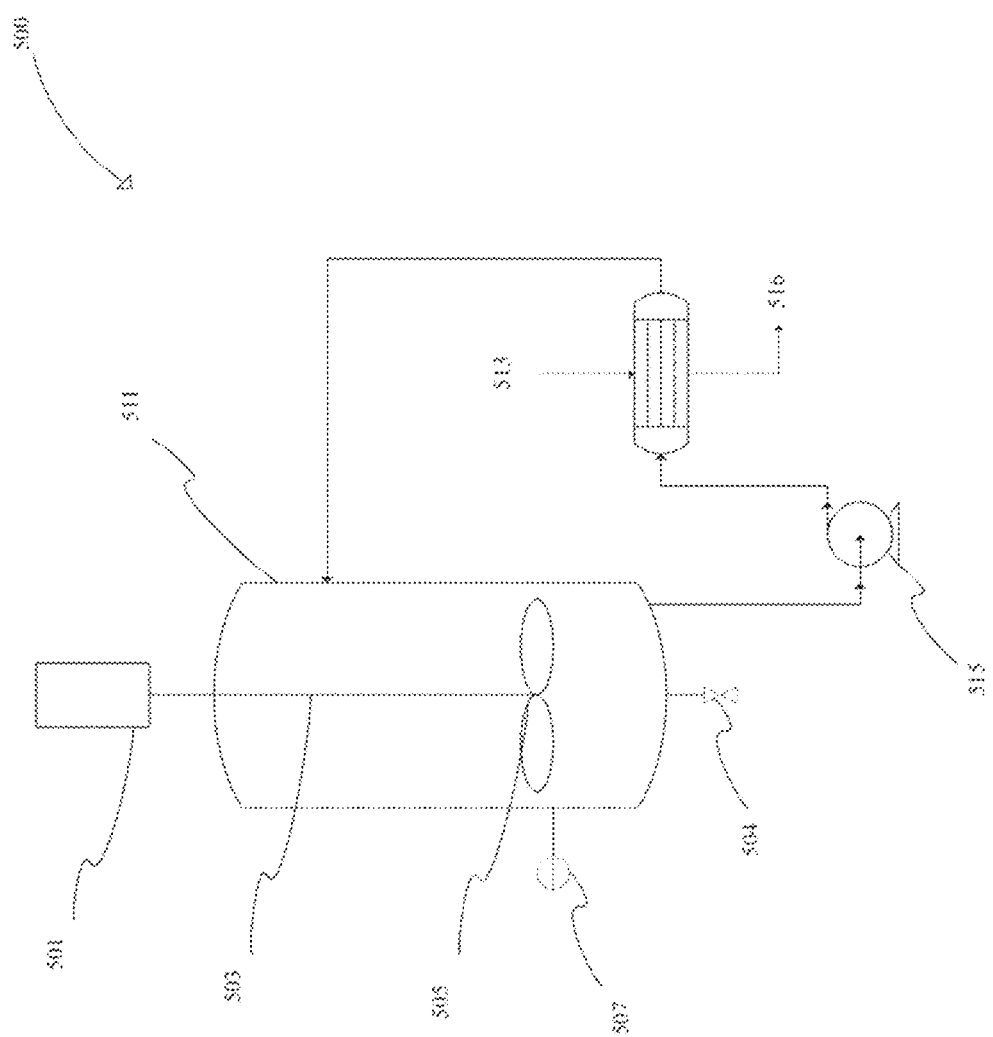
FIG. 5 is a schematic process flow diagram illustrating an embodiment of at least partially dehydrating an emulsion phase according to the present disclosure.

FIG. 5 illustrates an energy saving embodiment of a system 500 for removing water from the emulsion by heating the emulsion to form an at least partially dehydrated emulsion layer/phase and an aqueous layer/phase. As shown in FIG. 5, an emulsion can be provided in an insulated tank 511 and mixed using a mixing system that includes mixer motor 501, mixer shaft 503, and mixer blades 505. The temperature of the emulsion can be adjusted, e.g., from 80° C. to 100° C. by, e.g., circulating the emulsion through a heat exchanger 513 via a pump 515. Hot water or steam is supplied to the heat exchanger to heat the emulsion. Steam condensate 516 can be directed as desired. The temperature can be monitored using temperature sensor 507. The emulsion can be kept at from 80° C. to 100° C. and mixed for a time period to cause a desired separation of the emulsion into an aqueous phase and a dehydrated emulsion phase. In some embodiments, the emulsion can be mixed for a time period of 5 minutes to 2 hours. After mixing, the contents can settle for a time period (e.g., from 15 minutes to an hour) to allow the dehydrated emulsion phase and aqueous phase to form. The aqueous phase may be drained via drain valve 504. Alternatively, the emulsion phase can be heated without mixing to form the dehydrated emulsion phase and aqueous phase but it may take longer. As yet another alternative, the emulsion phase to be heated to evaporate moisture but that may require more energy.

In some embodiments, the dehydrated emulsion product includes a moisture content of 20 percent or less by weight of the total dehydrated emulsion product, 10 percent or less by weight of the total dehydrated emulsion product, 5 percent or less by weight of the total dehydrated emulsion product, 1 percent or less by weight of the total dehydrated emulsion product, or even 0.5 percent or less by weight of the total dehydrated emulsion product. In some embodiments, the moisture content can be from 0.01 to 5 percent by weight of the total dehydrated emulsion product, from 0.01 to 1 percent by weight of the total dehydrated emulsion product, from 0.01 to 0.5 percent by weight of the total dehydrated emulsion product, or even from 0.1 to 0.5 percent by weight of the total dehydrated emulsion product. Moisture content can be determined by a Karl Fischer titration (e.g., following ASTM E1064-12 or AOCS 2e-84).

In some embodiments, a dehydrated emulsion product can have at least 100 ppm of an element component, wherein the element component comprises at least one element chosen from calcium, phosphorus, potassium, sodium, and combinations thereof.

Optionally, a grain oil composition (e.g., grain oil composition feedstock and/or oil phase (grain oil product)) and/or a byproduct of a grain oil composition (e.g., emulsion phase and/or dehydrated emulsion phase) can be further treated by one or more processes. Nonlimiting examples of such processes include one or more filtering, bleaching, deodorizing and/or homogenizing (to reduce separation) to improve its usefulness in various applications.

A variety of bleaching processes can be used. Nonlimiting examples include one or more of hydrogen peroxide treatment, activated charcoal plus hydrogen peroxide treatment, and air/heat treatment.

An example of a hydrogen peroxide protocol includes mixing a grain oil composition and/or a byproduct of a grain oil composition with 10 vol % of 30% hydrogen peroxide. The mixture can be heated with vigorous stirring to a temperature that causes the water to boil. The mixture can be boiled until a temperature of greater than 130° C. is achieved and all boiling has stopped. The amount of peroxide can be varied, which can result in varying degrees of color change.

An example of an activated charcoal plus hydrogen peroxide includes mixing a grain oil composition and/or a byproduct of a grain oil composition mixed with 2.5 mass % activated charcoal and heating the mixture to 85° C. for 1 hour while mixing. The mixture can be filtered while hot to remove the charcoal. The treated oil can then be combined with 10 vol % of 30% hydrogen peroxide. The mixture can be heated with vigorous stirring to a temperature that causes the water to boil. The mixture can be boiled until a temperature of greater than 130° C. is achieved and all boiling has stopped. The amount of peroxide can be varied, which can result in varying degrees of color change. An example of air/heat treatment protocol includes sparging a grain oil composition and/or a byproduct of a grain oil composition with compressed air (e.g., at a flowrate of 1 L/min) while heating to a temperate of about 190° C. for a sufficient time period (e.g., about an hour).

Using a Grain Oil Composition and/or a Byproduct of a Grain Oil Composition:

A grain oil composition such as grain oil product produced by a method of refining according to the present disclosure can be used in a wide variety of applications. Such exemplary applications include the areas of oleochemicals, feed (e.g., animal feed) as well as oils suitable for human consumption, an anti-foam agent, and a carrier (e.g., a bio-based mineral oil replacement). In some embodiments, the grain oil composition is a valuable diesel fuel feedstock such as for biodiesel, renewable diesel, low sulfur fuel oil, and co-processing with hydrocarbon stocks. The refined oil can be more compatible with diesel processes than is other distillers oil, e.g. distillers corn oil, because it is less likely to poison catalysts, e.g., due to reduced metal content in the refined oil.

In some embodiments, the grain oil product can be used for asphalt modification, rubber modification, and as a lubricant. In other embodiments, the grain oil product can be used as a nutrition source. For example, the refined oil may be used in animal and human food formulations. In some embodiments, the refined oil may be used for in pharmaceutical preparations.

A by-product of a grain oil composition produced as a result of refining according to the present disclosure (e.g., an emulsion phase and/or a dehydrated emulsion) can be used for a variety of purposes as well. For example, it has been found that the emulsion and emulsion products behave much like lecithin. The emulsion and emulsion products are believed to be useful, like lecithin, in a variety of applications and perform an array of valuable functions. In edible compositions, they may contribute nutritional value and also can act as an emulsifying agent, surface active agent, anti-spattering-agent, or stabilizing agent. They may be used in technical applications as an anti-foam agent, dispersing agent, wetting agent, stabilizing agent, anti-knock compound, mold release and antioxidant. In cosmetics and pharmaceuticals, they may be used as stabilizer, emollient, emulsifier, wetting agent, softening agent, carrier, and penetration enhancer.

Using a Grain Oil Composition and/or by-Product of a Grain Oil Composition to Control Foam in Foamable Compositions:

A grain oil composition and/or by-product of a grain oil composition as described herein can be used in the context of an anti-foam to help control (prevent or reduce) foaming in a variety of foamable compositions. "Anti-foam" and "defoamer" are used interchangeably herein. Anti-foam/defoamer formulations can be oil based. For example, oil based anti-foam compositions can be used to control foam in water based systems.

In some embodiments, an anti-foam composition according to the present disclosure includes a grain oil derived from a fermentation product. In some embodiments, the grain oil can include one or more (blends) of any of the grain oil compositions and byproducts of a grain oil composition as described herein. Non-limiting examples of grain oil composition include a grain oil composition feedstock or a grain oil product (light phase) as described herein. Non-limiting examples of a by-product of grain oil composition include an emulsion phase or a dehydrated emulsion phase (heavy phase) as described herein above. Blends of one or more of these grain oils can also be used. In some embodiments, the heavy phase can provide better foam reduction as shown in, e.g., Table 5 in the Examples section below.

However, the light phase may be desirable in cases where downstream processes include catalysts that can be poisoned by metals that may be present in the heavy phase. In some embodiments, the light phase and/or heavy phase can also be used as a carrier oil component in defoamer compositions containing other active ingredients.

In some embodiments, one or more additional oils can be combined with a grain oil derived from a fermentation product to form a carrier oil component. Selection of a carrier oil can be for many different reasons including price, availability, biodegradability, and being a renewable product rather than a petroleum based product. A wide variety of plant and non-plant oils can included in the carrier oil component. For example, the carrier oil component can also include mineral oil. The light phase and/or heavy phase described herein can also be used to replace at least a portion of mineral oil as a carrier oil component in defoamer compositions containing other active ingredients. For example, a grain oil derived from a fermentation product can be mixed with mineral oil in a wide range of amounts to form an anti-foam composition that can flow and spread throughout a composition so as to reduce or prevent the foaming of the composition. In some embodiments, the weight ratio of the grain oil derived from a fermentation product to the mineral oil can be in the range from to 1:90 to 1:1 or even less than 1:1, or even from 1:4 to less than 1:1.

A grain oil derived from a fermentation product can be combined with one or more anti-foaming ingredients/additives in a wide range of amounts depending on the final application. Non-limiting examples of anti-foaming ingredients/additives include dimethylpolysiloxane, formaldehyde polyacrylic acid; mineral oil; polyethylene glycol (400) dioleate; [alpha]-hydro-omega-hydroxy-poly(oxyethylene)/poly(oxypropylene) (minimum 15 moles)/poly(oxyethylene); polyethylene glycol; polyoxyethylene 40 monostearate; polysorbate 60; polysorbate 65; propylene glycol alginate; silicon dioxide; sorbitan monostearate; aluminum stearate; butyl stearate; BHA; BHT; calcium stearate; fatty acids; formaldehyde; hydroxylated lecithin; isopropyl alcohol; magnesium stearate; petroleum wax; oleic acid; synthetic isoparaffinic petroleum hydrocarbons; oxystearin; polyoxyethylene dioleate; polyoxyethylene monoricinoleate; polypropylene glycol; polysorbate 80; potassium stearate; propylene glycol mono- and diesters of fats and fatty acids; soybean oil fatty acids (hydroxylated); tallow (hydrogenated, oxidized or sulfated), and mixtures thereof. In some embodiments, an anti-foam composition includes at least one hydrophobic particle component. A hydrophobic particle component can include hydrophobic wax particles, one or more hydrophobic silica particles, and mixtures thereof. In some embodiments, an anti-foam composition contains no detectable amount of phospholipid.

An anti-foam composition can be provided with a viscosity to facilitate one or more functions such as storage, transfer, application, and ability to prevent or reduce foam. A desirable viscosity or range of viscosities can depend on a variety of factors. Also, an anti-foam composition can be blended with one or more compositions to modify its viscosity. For example, if a grain oil derived from a fermentation product (e.g., dehydrated emulsion phase) is too thick, e.g., to pump, a grain oil derived from a fermentation product could be blended with mineral oil to reduce viscosity. Material handling issues, such as a thick vegetable oil anti-foam composition not flowing out of a tank or railcar could also be alleviated by adding mineral oil to reduce viscosity. Also, a lower viscosity anti-foam may disperse in a composition to be treated better than a higher viscosity antifoam. For example, an anti-foam with the viscosity of toothpaste may not disperse as readily as a lower-viscosity antifoam (when added to a process stream that needs to be defoamed or when added to the top of a foaming tank).

In some embodiments, an anti-foam composition and/or at least one of the grain oil composition or the byproduct of a grain oil composition has a Brookfield viscosity in the range from 10-300 centiPoise (cP) when measured at 22° C. and 100 rpm with a #31 spindle. In some embodiments, an anti-foam composition and/or at least one of the grain oil composition or the byproduct of a grain oil composition has a Brookfield viscosity in the range from 5-100 centiPoise (cP) when measured at 22° C. and 100 rpm with a #18 spindle. In some embodiments, an anti-foam composition and/or at least one of the grain oil composition or the byproduct of a grain oil composition has a Brookfield viscosity in the range from 5-100 centiPoise (cP) when measured at 22° C. and 50 rpm with a #18 spindle.

An anti-foam composition as described herein can be used to control foam in a foamable composition by mixing an amount of an anti-foam composition with the foamable composition to prevent, mitigate, or reduce foaming of the foamable composition. Foamable compositions that can benefit from an anti-foam composition include compositions that foam when subjected to agitation or mixing. Nonlimiting examples of foamable composition include one or more of aerobic digestion streams, wastewater treatment; manure pit foam; pulp and paper processing; coatings; paint; agrochemicals; food and beverage manufacturing; and one or more biorefinery compositions/process streams such as a stillage composition/stream.

One example of a stillage composition includes a stillage composition derived from processing "cellulosic biomass" such as corn stover. A stillage composition derived from corn stover includes fermenting a cellulosic mash to form a cellulosic beer; separating the cellulosic beer into a liquid stillage stream and a lignin cake stream. The liquid stillage stream can be mixed with an amount of an anti-foam composition as described herein to reduce foaming.

The amount of anti-foam composition to combine with a foamable composition can vary depending on the type of foamable composition, the process conditions, and the like. In some embodiments, the anhydrous heavy phase is added at a rate of 10-500 ppm, 20-300 ppm, 50-200 ppm, or approximately 100 ppm.

Mineral Oil Replacement:

Embodiments of the present disclosure also include reducing the amount of mineral oil carrier in a wide variety of compositions by replacing at least a portion of the mineral oil carrier in the composition with an amount of a grain oil composition derived from a fermentation product. The amount of mineral oil replace can depend on a variety of factors such as cost and functionality (e.g., viscosity). In some embodiments, the weight ratio of mineral oil replaced to the amount of a grain oil composition derived from a fermentation product is in the range from 0.5:1 to 1.5:1.

Stabilized and/or Homogeneous Emulsion:

In some approaches, the heavy emulsion phase and/or the emulsion product described above (such as emulsion 423 or 426 of FIG. 4) may be further treated or otherwise stabilized (and/or the methods described herein can be modified to stabilize such emulsions) to form a stabilized and/or homogeneous emulsion. As used herein, a stabilized and/or homogeneous emulsion refers to a water-in-oil emulsion that maintain a single phase for at least two weeks at ambient or room temperature (about 20 to about 25° C.). By maintaining a single-phase means the emulsion has no more than about 5% phase separation by volume, no more than about 2% phase separation by volume, no more than about 1% phase separation by volume, and preferably no phase separation within the two weeks storage time. To this end, the stabilized and/or homogeneous emulsion may be a water-in-oil emulsion including an oil phase derived from a byproduct of a grain material fermentation as discussed above. In some approaches, the oil phase is a corn oil phase derived from a fermentation byproduct of corn.

The stabilized emulsions herein may have an elevated soap content relative to the un-stabilized emulsions, and the soap content may be about 500 ppm or greater and be in form of a salt of fatty acids with alkali or alkaline-earth metals. In other approaches, the soap content may be 1,000 ppm or greater, about 2,000 ppm or greater, about 5,000 ppm or greater, about 8,000 ppm or greater, about 10,000 ppm or greater, about 15,000 ppm or greater, about 20,000 ppm or greater, about 25,000 ppm or greater, or even about 30,000 ppm or greater. The upper end of soap content may be about 100,000 ppm or less, about 90,000 ppm or less, about 80,000 ppm or less, about 70,000 ppm or less, about 60,000 ppm or less, about 50,000 ppm or less, about 40,000 ppm or less, about 30,000 ppm or less, 20,000 ppm or less, 15,000 ppm or less, or 10,000 ppm or less. The soap content may also include any other ranges within such specified endpoints as needed for a particular application and depending on the starting metal/soap content, treatment amounts, and/or residence time of the treatment discussed herein. As discussed further below, the elevated metal/soap content of the stabilized and/or homogeneous emulsions herein is obtained through an alkali or alkaline metal base treatment of the grain oil composition feedstock (which may be streams 423, 426). In some embodiments, the stabilized emulsions herein, after such further metal base treatment, may have an increase in metal or soap content over the untreated emulsions of about 50× more, about 100× more, about 200× more, about 300× more, about 400× more, about 1500× more, or even up to about 2000× more metal/soaps (or any range therebetween) depending on the level of base treatment, the starting amount of metals/soaps in the emulsions, and/or the residence time of the treatments.

In approaches, the stable and/or homogenous emulsion may have a Brookfield viscosity (after at least two weeks of room temperature storage) of about 100 to about 1,000 cP at 23° C. using spindle 64 and, in other approaches, a Brookfield viscosity of about 150 to about 850 cP and, in yet other approaches, a Brookfield viscosity of about 150 to about 820 cP when performed at a speed of 100 to 200 RPM as described further below in the Examples. Such viscosity is higher compared to non-treated emulsions and may aid in maintaining a stable emulsion without phase separation. The emulsions may also have a pH of about 7 to about 12 (in some approaches, about 8 to about 9.5, and in other approaches, about 8.5 to about 9.5). As discussed, the emulsions remain a single-phase, homogeneous emulsion for at least about two weeks at about 20° C. to about 25° C. In other approaches, the emulsions also remain a single phase or homogeneous without phase separation and further maintain the above noted viscosity for at least about two weeks at about 20° C. to about 25° C.

The stable and homogeneous emulsions, in some embodiments and after the metal base treatment, typically have a triglyceride content of about 70 to about 90 weight percent based on the total weight of the emulsion (in other approaches, about 75 to about 88 weight percent, and in yet other approaches, about 80 to about 86 weight percent). The stabilized emulsions, in other embodiments, may also have after treatment, a monoglyceride content of about 5 to about 10 weight percent, and in other approaches, about 5 to about 8 weight percent. In yet other embodiments, the stabilized emulsions may have a diglyceride content, after treatment, of less than about 5 weight percent and, in other embodiments, about 2 to about 5 weight percent. The triglycerides, diglycerides, and monoglycerides are measured and otherwise discussed per the above disclosure.

The stabilized emulsion also has a free fatty acid content. In some approaches, the free fatty acid content may be about 10 weight percent or less or even about 5 weight percent or less based on the total weight of the emulsion. The emulsions may also have about 1 weight percent or more, about 2 weight percent or more, or about 3 weight percent or more of the free fatty acids. Free fatty acids are also as described above.

The stabilized emulsions herein uniquely include a retained soap content that results in elevated levels of soaps. Thus, the emulsions herein have an elevated soap content relative to total glyceride or total free fatty acid content in the stabilized emulsions and as compared to untreated emulsions because the soaps are not removed from the stabilized emulsions. Without wishing to be limited by theory, the increased levels of soaps retained in the composition may aid, among other features, in the stabilization of the emulsions. To this end and in one approach, the stabilized and/or homogeneous emulsions may have a weight ratio of soap to total glyceride content of about 1:30 to about 1:65, and in other approaches, about 1:30 to about 1:100, in other approaches, about 1:30 to about 1:200, and in yet other approaches, about 1:300 to about 1:400. The stabilized compositions, in some embodiments, may also have an elevated level of soap relative to free fatty acids and as compared to untreated emulsions. Thus, in other embodiments, the emulsions herein may also have a weight ratio of soap to free fatty acid content of about 1:0.7 to about 1:2 (in other approaches, about 1:0.7 to about 1:30), which is believed may also aid, among other features, in the stabilization of the emulsions herein. Discussion of exemplary weight ratios is provided further in the Examples below.

In approaches, the elevated metals content of the stabilized emulsions may include metals (or soaps thereof) of calcium, phosphorus, lithium, sodium, potassium, magnesium, or combinations thereof. The soaps may be in the form of salts of fatty acids with the alkali or alkaline-earth metals. Exemplary soaps may include, based on the selected treatment (as described further below) sodium oleate, sodium stearate, potassium oleate, potassium stearate, magnesium oleate, magnesium stearate, sodium palmitate, potassium palmitate, magnesium palmitate, sodium linoleate, potassium linoleate, magnesium linoleate, or combinations thereof. Again, such soaps are retained in the final emulsion products.

The stable and/or homogeneous emulsion is obtained from an alkali or alkaline metal base treatment of the byproduct from the grain material fermentation described above. In approaches, the alkali or alkaline metal base treatment may be, for example, a solution of sodium hydroxide, potassium hydroxide, magnesium hydroxide, or combinations thereof and the like metal bases. The solution of the metal base may be about 30 to about 60% w/v aqueous solutions, and in yet other approaches, about 50% w/v solutions of the metal base. Such treatments partially or, in some cases, fully hydrolyzes at least a portion of the glycerides and/or free fatty acids in the untreated emulsions to form the soaps. Without wishing to be limited by theory, it is believed that the metal base treatment may preferentially react with free fatty acids and/or diglycerides in the emulsions over the monoglycerides and/or triglycerides, but these other glycerides may be partially or fully hydrolyzed to soaps as well depending on the treatment conditions, times, and/or amounts.

In other approaches or embodiments, the treatment of the grain oil composition feedstock as described above and, in other approaches, streams 432 or 426 (that is, an example of a byproduct of a grain material fermentation) may be an amount of the metal base solution from at least about 0.1% v/v, at least about 0.15% v/v, or at least about 0.2% v/v to about 0.27% v/v or less, about 0.25% v/v or less, or about 0.2% v/v or less of the alkali or alkaline metal base solution. Turning back to FIG. 4 or 5 for a moment, the stabilization treatment methods herein may include the alkali metal base treatment injection as shown through the optional injection points 1000 in the flow diagrams of FIG. 4 or 5. While not shown in the Figures, the alkali metal base treatment injection point may be at other locations in the process as needed depending on the circumstances, Metal base injection may be through an inlet or injection port using a small volume injection pump or equivalent depending on the size, volume, and/or configuration of the process.

In some approaches, the temperature of metal base solution, the grain oil composition feedstock, and/or the emulsion during such metal base treating steps (as the case may be) may be about 0° C. to about 50° C. or, in other embodiments, about 20 to about 25° C. In alternative approaches, the temperatures during metal base treatment may be elevated at about 150° C. or higher (such as about 150° C. to about 200° C.) depending on the treatment location in the methods. After treatment, the stabilized and/or homogeneous emulsions herein may have a pH of about 7 to about 12, and in other approaches, about 8 to about 10, and in yet other approaches, about 8 to about 9.8, and in yet further approaches, about 8.5 to about 9.5. Treatment may be in a continuous fashion or batch-wise as needed and contact time of the metal base with the emulsion product may be up to about 30 minutes of reaction time or about 1 minute to about 30 minutes of mixing or blending.

As described above with respect to FIG. 5, the stable and/or homogeneous emulsions may optionally be further treated, heated, and/or evaporated to remove water to form dehydrated and stabilized emulsions as described above with respect to such other embodiments. To this end, the stabilized and homogeneous emulsions may further include water, but no more than about 3 weight percent water, in other approaches, no more than 2 weight percent water, and in yet other approaches, no more than 1 weight percent water.

EXAMPLES

The following examples are illustrative of exemplary embodiments of the disclosure. In these examples, as well as elsewhere in this application, all ratios, parts, and percentages are by weight unless otherwise indicated or apparent from the context of the disclosure. It is intended that these examples are being presented for the purpose of illustration only and are not intended to limit the scope of the invention disclosed herein.

Example 1

Distiller's corn oil from five different sources was obtained and tested as described herein. To each 50 ml centrifuge tube were added 40 ml of room temperature distiller's corn oil and 10 ml of water (RO) to make a 20 vol % mixture of water and oil. The mixture was vigorously mixed using a vortex mixer to form an emulsion. Each of the tubes were centrifuged on a bench top centrifuge that had been chilled to 4° C. and spun at 4500 rpm for 30 minutes. Each sample was removed from the centrifuge and using vacuum suction the supernatant from the top was removed from each tube. The process resulted in a clarified, light phase (top layer) (corn oil product) and a heavy phase (bottom layer) (emulsion phase). Table 1 shows the percentage of the clarified, light phase and heavy phase.

TABLE 1

| Sample ID | % Clarified Phase | % Heavy Phase |
| --- | --- | --- |
| DCO 1 | 96.57 | 3.43 |
| DCO 2 | 89.90 | 10.10 |
| DCO 3 | 92.86 | 7.14 |
| DCO 4 | 79.25 | 20.75 |
| DCO 5 | 93.27 | 6.73 |
| Mean | 90.37 | 9.63 |

Table 2 shows the concentration of metals in ppm for each of the sample oils before the treatment with water and separation.

TABLE 2

| Sample ID | Calcium | Magnesium | Phosphorus | Potassium | Sodium |
| --- | --- | --- | --- | --- | --- |
| DCO 1 | 13 | 103 | 49 | 40 | 81 |
| DCO 2 | 10 | 64 | 41 | 30 | 60 |
| DCO 3 | 1 | 10 | 6 | 44 | 72 |
| DCO 4 | 45 | 219 | 142 | 37 | 111 |
| DCO 5 | 1 | 10 | 7 | 25 | 53 |

Table 3 show the concentration of metals in ppm for each of the sample oils after the treatment with water and separation as measured in the clarified, light phase.

TABLE 3

| Sample ID | Calcium | Magnesium | Phosphorus | Potassium | Sodium |
| --- | --- | --- | --- | --- | --- |
| DCO 1 Clarified | <1 | 1 | 3 | 2 | 3 |
| DCO 2 Clarified | <1 | 2 | 3 | <2 | 4 |
| DCO 3 Clarified | <1 | 1 | 3 | 5 | 7 |
| DCO 4 Clarified | 1 | 7 | 5 | 4 | 9 |
| DCO 5 Clarified | <1 | 1 | 3 | 5 | 5 |

The metals were determined according to AOCS Ca 17-01, were xylene was used as the solvent.

Example 2

Distiller's corn oil obtained from a fermentation plant passed through a heat exchanger to cool/heat the oil to ~65° F. Water was introduced into a pipe at a rate to make a 15 vol % water solution. The oil/water mix was passed through an inline pipe mixer to form an emulsion. The mixed oil/water mixture was then processed through a nozzle clarifier centrifuge resulting in a clarified light phase (corn oil product) and a heavy phase (emulsion phase). The light and heavy phase was split 79% clarified phase and 21% heavy phase. Table 4 shows the metals for untreated distiller corn oil (DCO) compared to distillers corn oil processed (DCO clarified).

TABLE 4

| Sample ID | Calcium | Magnesium | Phosphorus | Potassium | Sodium |
| --- | --- | --- | --- | --- | --- |
| DCO | 18 | 125.5 | 82.5 | 46.5 | 98.5 |
| DCO Clarified | 2.9 | 5.8 | 3.1 | 3.3 | 2.5 |

It can be seen that the addition of water in the separation process aids in reducing the metal content in the clarified oil phase.

Example 3

Samples of a heavy phase (emulsion phase as obtained from the preparation of the oil/water mixture and then separated as described in Example 1) were dried by evaporating the water on a hot plate. The oil was Voila® corn oil. The dried emulsion was then bleached using heat and the addition of hydrogen peroxide to produce a material with a lighter color that when re-emulsified with water appeared white. The dried emulsion was extracted with acetone yielding an oil fraction and a de-oiled precipitate fraction.

Example 4

Samples of the heavy phase (emulsion phase as obtained from the preparation of the oil/water mixture and then separated) were dried via evaporation to form an anhydrous heavy phase. The anhydrous heavy phase was used in place of a commercial anti-foam product. The anhydrous heavy phase was trickled into a wastewater treatment process at a range of 50-200 ppm to reduce foaming during wastewater treatment. Foaming was controlled to a level comparable to commercial anti-foam products typically used in wastewater treatment facilities.

Example 5

FIGS. 6A through 6G and Table 5 show percent foam reduction when adding different antifoams (defoamers) at varying concentrations to an aqueous solution of sodium lauryl ether sulfate (SLES). The aqueous solution contained 0.1 mass % SLES in water. After performing an antifoam testing procedure, the volume of foam with and without antifoam was used to calculate a volume-percent foam reduction. Foam reduction data was generated based on the following modified version ASTM test method: E2407-05 (2015) Standard Test Method for Effectiveness of Defoaming Agents. The antifoam testing procedure used to measure the effectiveness of various antifoams is shown below.

Antifoam testing procedure: (1) Load 250 ml of substrate (0.1 mass % sodium lauryl ether sulfate (SLES) in water or other substrate) into a Wearing blender that contains a glass vessel. (2) Reduce the power to the blender to 60% of full power. (3) Blend the substrate for 30 seconds. (4) Let the blended substrate stand 3 minutes. (5) Record the liquid level in a spreadsheet. (6) Record the foam level in the spreadsheet. (7) Add the correct volume of antifoam agent to the substrate using a repeater pipette. (8) Blend the substrate and antifoam agent mixture for 30 seconds. (9) Let the substrate and antifoam agent mixture stand for 6 minutes. (10) Record the liquid level in the spreadsheet. (11) Record the foam level in the spreadsheet. (12) Calculate the foam reduction using the volume of foam that remained when antifoam agent was not present (after step 4—initial foam volume) and the volume of foam that remained when antifoam agent was present (after step 9—final foam volume). Percent foam reduction was calculated by subtracting the final foam volume from the initial foam volume. This difference in volume was then divided by the initial foam volume and multiplied by 100 to obtain a volume percent foam reduction. (13) Rinse the vessel with hot water.

Figure 6A:
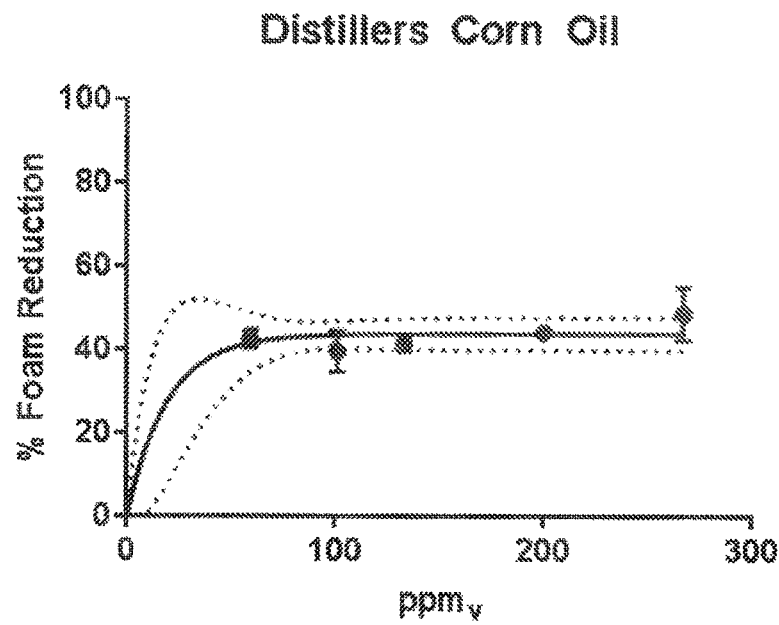
FIGS. 6A through 6G illustrate data from Example 5 and show volume percent foam reduction for seven different corn oil based antifoams at varying dose rates when using a model substrate (0.1 mass % sodium lauryl ether sulfate (SLES) in water)
Figure 6B:
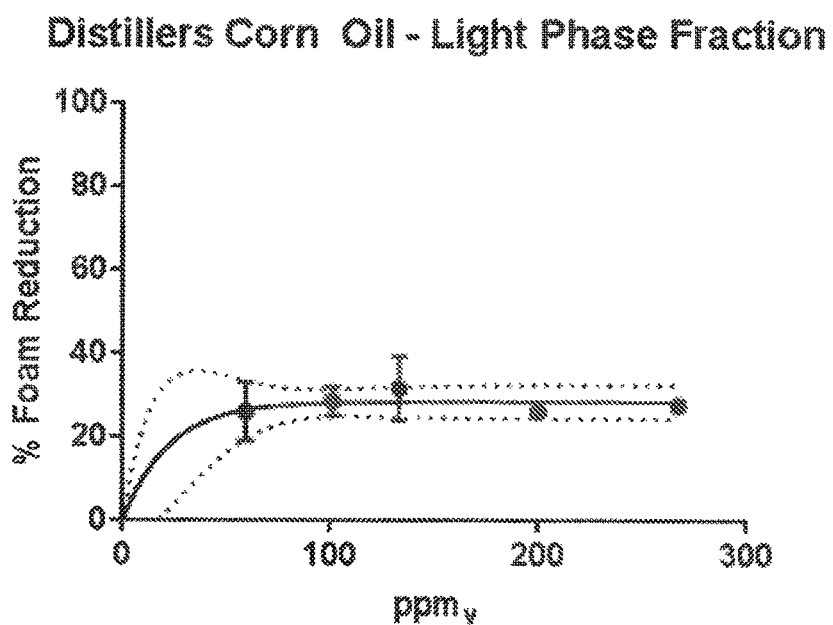

FIGS. 6A through 6G show volume percent foam reduction for seven different corn oil based antifoams at varying dose rates when using a model substrate (0.1 mass % SLES in water). The dose rates are reported as parts per million by volume (ppmv). FIG. 6A shows foam reduction data when using DCO having a fatty acid ethyl esters content of about 10 percent by weight based on the total weight of the DCO as antifoam. FIG. 6B shows foam reduction data when using DCO light phase fraction as anti-foam.

Figure 6C:
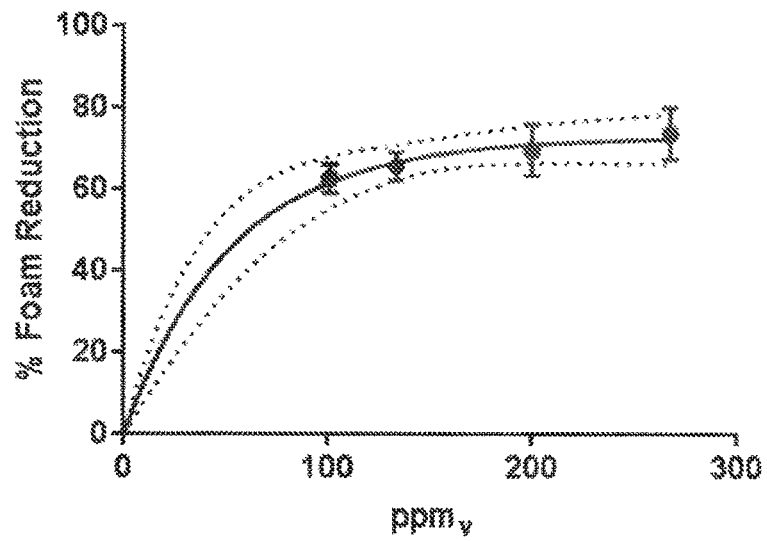

DCO light phase fraction refers to the light phase fraction of DCO obtained from the DCO in FIG. 6A and isolated by centrifuging DCO and removing the top, clarified layer of corn oil. Alternatively, the fractions can be isolated by gravity settling DCO and removing the top, clarified layer of corn oil. FIG. 6C shows foam reduction data when using DCO heavy phase fraction as anti-foam. DCO heavy phase fraction refers to the heavy, bottom layer of DCO obtained from the DCO in FIG. 6A.

Figure 6D:
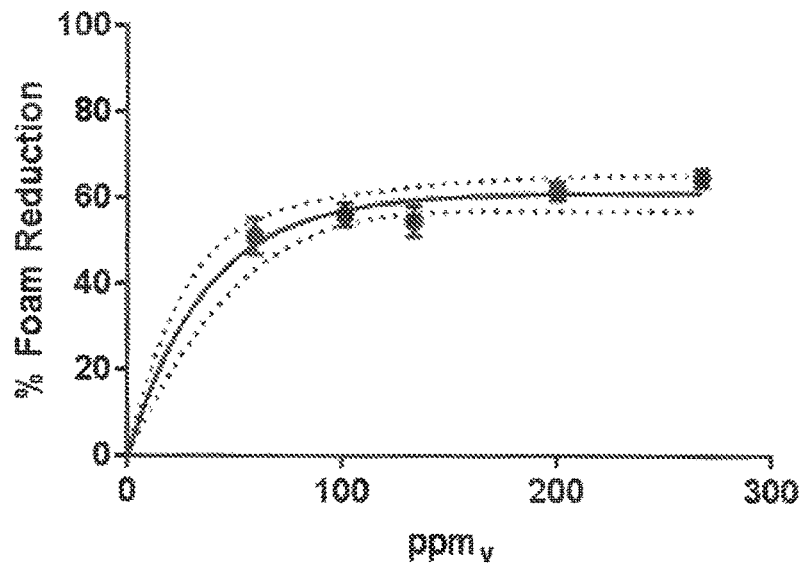

FIG. 6D shows foam reduction data when using high ethyl ester corn oil (HEECO) as anti-foam. The HEECO sample used to generate the data shown in FIG. 6D through FIG. 6G contained approximately 60% fatty acid ethyl esters. As mentioned above, HEECO can be produced by adding a lipase or esterase during the fermentation step at a biorefinery. When a lipase or esterase is added to fermentation, the corn oil that is subsequently separated contains a higher concentration of fatty acid ethyl esters and may have enhanced utility to act as an antifoam. In this example, a lipase addition of approximately 25 ppm in fermentation resulted in a corn oil that contained approximately 60% ethyl esters. Alternatively, in a process separate from fermentation, DCO can be combined with ethanol in the presence of a catalyst such as an acid, base, or lipase to generate HEECO. Comparing FIG. 6D to FIG. 6A illustrates that corn oil exposed to a lipase or esterase has enhanced antifoam capability, compared to corn oil not exposed to a lipase or esterase.

Figure 6E:
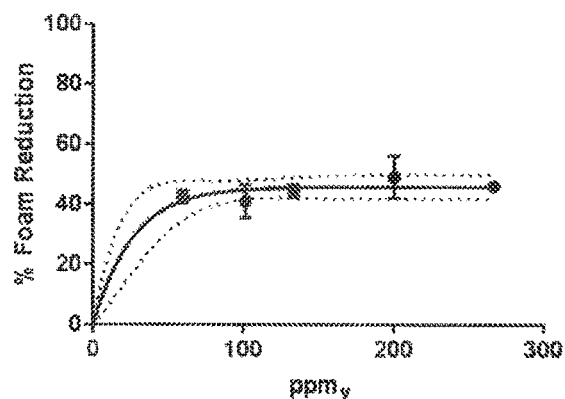

FIG. 6E shows foam reduction data when using HEECO light phase fraction as anti-foam. HEECO light phase fraction refers to the light phase fraction of a high ethyl ester corn oil and in this example was the light phase separated from the HEECO of FIG. 6D.

Figure 6F:
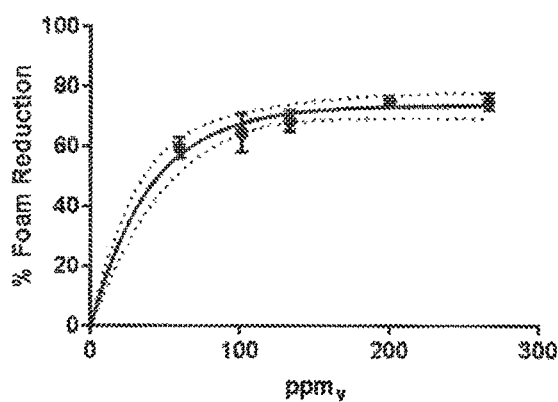

FIG. 6F shows foam reduction data when using HEECO heavy phase fraction as anti-foam. HEECO heavy phase fraction refers to the heavy phase fraction of a high ethyl ester corn oil and in this example was the heavy phase separated from the HEECO of FIG. 6D. These heavy and light phases can be isolated in a similar fashion as described above for DCO light phase fraction and DCO heavy phase fraction.

resulted in a greater volumetric foam reduction, compared to the DCO sample. Similarly, the HEECO heavy phase fraction resulted in a greater volumetric foam reduction, compared to the HEECO sample. This result may be advantageous in that the DCO light phase fraction and the HEECO light phase fraction are clear with a homogeneous appearance. These oil characteristics may be desirable for certain vegetable oil customers. A corn oil separation process that produces a heavy phase fraction, that can be used as an anti-foam, and a light phase fraction, which is clear and homogeneous, may be beneficial because it converts a commodity corn oil into two potentially higher value products.

TABLE 5

| | Distillers Corn Oil | DCO Light Phase Fraction | DCO Heavy Phase Fraction | High Ethyl Ester Corn Oil (HEECO) | HEECO Light Phase Fraction | HEECO Heavy Phase Action | HEECO Heavy Phase Fraction Mixed With Mineral Oil |
|---|---|---|---|---|---|---|---|
| Volume % Foam Reduction (Plateau) | 43.7 | 28.38 | 72.6 | 61.07 | 45.81 | 73.7 | 79.04 |
| Destiny | 0.916 | 0.916 | 0.934 | 0.890 | 0.883 | 0.928 | NA |

Figure 6G:
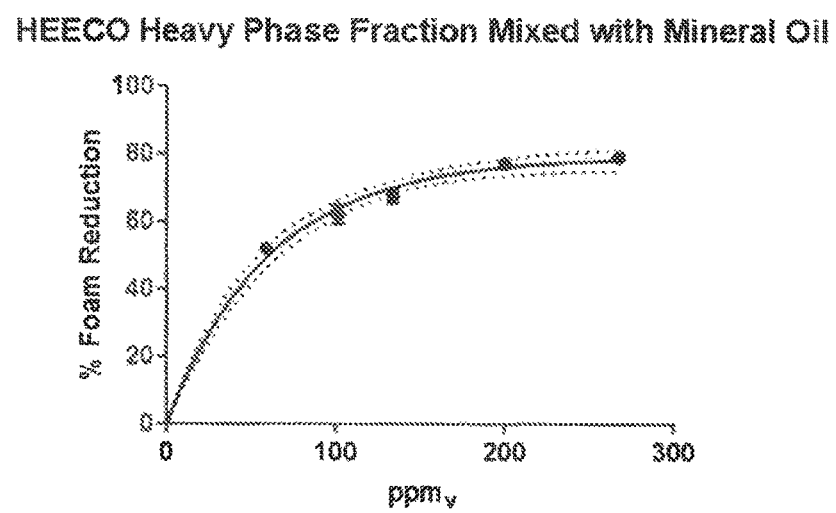

FIG. 6G shows foam reduction data for a sample that was prepared by combining HEECO heavy phase fraction with mineral oil in a ratio to form a mixture comprising approximately 25 mass % HEECO heavy phase fraction in mineral oil. In some examples, a lower concentration of HEECO heavy phase in mineral oil may be desirable, e.g., to lower the viscosity of the mixture and make the antifoam composition more flowable. Flowability may be important for applications where antifoam is pumped, transported through pipes, or removed from storage containers or vessels. In such examples, the concentration of HEECO heavy phase in mineral oil may range, e.g., from 0.01 to 25 mass %, including the end points of this range. In other examples, higher concentration of HEECO heavy phase fraction in mineral oil may be desirable, e.g., to reduce shipping costs of the HEECO heavy phase fraction active ingredient. In such examples, the concentration of HEECO heavy phase in mineral oil may range from 25 to 50 mass %, including the end points of this range.

Table 5 is a table that shows the volume percent foam reduction for DCO, DCO light phase fraction, DCO heavy phase fraction, HEECO, HEECO light phase fraction, HEECOheavy phase fraction, and a mixture of HEECO heavy phase fraction and mineral oil when using a model substrate (0.1 mass % SLES in water). The values in Table 5 are the point at which the curves in FIGS. 6A through 6G plateau. As shown in Table 5, the DCO heavy phase fraction Tables 6-8 show compositional analysis for the samples shown in FIGS. 6A-6F. Table 6 shows elemental analysis data for the following samples: DCO, DCO light phase fraction from the DCO, DCO heavy phase fraction from the DCO, HEECO, HEECO light phase fraction from the HEECO, and HEECO heavy phase fraction from the HEEECO. The HEECO sample in Table 6 contained approximately 60% ethyl esters.

Table 7 shows fatty acid composition data for the following samples: DCO, DCO light phase fraction from the DCO, DCO heavy phase fraction from the DCO, HEECO, HEECO light phase fraction from the HEECO, and HEECO heavy phase fraction from the HEECO. The HEECO sample in Table 7 contained approximately 60% ethyl esters.

Table 8 shows mono- and diglyceride concentration and soap concentration data for the following sample: DCO, DCO light phase fraction from the DCO, DCO heavy phase fraction from the DCO, HEECO, HEECO light phase fraction from the HEECO, and HEECO heavy phase fraction from the HEECO. Table 8 also shows wax concentration data for a sample of DCO heavy phase fraction and a sample of HEECO heavy phase fraction. The HEECO sample in Table 8 contained approximately 60% ethyl esters. The compositional differences between the seven samples shown in Tables 6-8 may be responsible for the varying effectiveness in foam reduction when using these samples in antifoam applications.

TABLE 6

| Elemental Analysis | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Action | Units |
|---|---|---|---|---|---|---|---|
| Calcium | 38.50 | 0.98 | 25.30 | 62.50 | 37.00 | 171.00 | ppm |
| Magnesium | 232.00 | 1.76 | 83.50 | 207.00 | 32.10 | 1,810.00 | ppm |
| Phosphorus | 162.00 | 0.99 | 56.60 | 59.30 | 9.89 | 569.00 | ppm |

TABLE 6-continued

| Elemental Analysis | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Action | Units |
|---|---|---|---|---|---|---|---|
| Potassium | 60.10 | 15.90 | 112.00 | 103.00 | 89.40 | 293.00 | ppm |
| Sodium | 130.00 | 18.60 | 382.00 | 578.00 | 547.00 | 1,370.00 | ppm |

TABLE 7

| Fatty Acid Composition | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| C8 Caprylic | | | | | | 0.50 | mg FA/g |
| C10 Capric | | | | | | 0.40 | mg FA/g |
| C14 Mytistic | 0.50 | 0.40 | 0.40 | 0.60 | 0.60 | 0.50 | mg FA/g |
| C16 Palmitic | 124.90 | 119.90 | 146.10 | 123.10 | 118.60 | 168.70 | mg FA/g |
| C16:1n7 Palmitoleic | 1.70 | 1.70 | 1.50 | 1.60 | 1.60 | 1.20 | mg FA/g |
| C17 Margaric | 0.60 | 0.70 | 0.80 | 0.60 | 0.60 | 0.90 | mg FA/g |
| C18 Stearic | 18.00 | 17.60 | 22.00 | 18.10 | 17.20 | 26.40 | mg FA/g |
| C18:1n9 Oleic | 248.10 | 253.60 | 231.40 | 234.10 | 241.00 | 192.40 | mg FA/g |
| C18:1n7 Vaccenic | 4.90 | 5.40 | 4.40 | 5.50 | 4.70 | 4.30 | mg FA/g |
| C18:2 Linoleic | 484.30 | 492.90 | 446.80 | 448.10 | 460.60 | 363.80 | mg FA/g |
| C18:3n3 alpha-Linolenic | 11.90 | 12.40 | 11.20 | 11.70 | 12.00 | 9.40 | mg FA/g |
| C20 Arachidic | 3.80 | 3.60 | 4.50 | 3.70 | 3.40 | 6.20 | mg FA/g |
| C20:1 Eicosenoic | 3.20 | 3.30 | 2.90 | 3.20 | 3.30 | 2.70 | mg FA/g |
| C20:2n6 Eicosadienoic | 0.30 | 0.30 | 0.20 | 0.30 | 0.40 | 0.30 | mg FA/g |
| C22 Behinic | 1.60 | 1.30 | 2.90 | 1.60 | 1.30 | 4.00 | mg FA/g |
| C24 Lignoceric | 2.00 | 1.70 | 3.40 | 2.10 | 1.80 | 5.00 | mg FA/g |
| Others | 1.60 | 2.40 | 1.80 | 2.60 | 3.00 | 2,50 | mg FA/g |
| Total Fatty Acid | 907.40 | 917.20 | 880.30 | 856.90 | 870.10 | 789.20 | mg FA/g |
| Total Saturates | 151.40 | 145.20 | 180.10 | 149.80 | 143.50 | 212.60 | mg FA/g |
| Total Monounsaturates | 257.90 | 264.00 | 240.20 | 244.40 | 250.60 | 200.60 | mg FA/g |
| Total Polyunsaturates | 496.50 | 505.60 | 458.20 | 460.10 | 473.00 | 373.50 | mg FA/g |
| Total Omega 3 | 11.90 | 12.40 | 11.20 | 11.70 | 12.00 | 9.40 | mg FA/g |
| Total Omega 6 | 484.60 | 493.20 | 447.00 | 448.40 | 461.00 | 364.10 | mg FA/g |
| Total Omega 9 | 251.30 | 256.90 | 234.30 | 237.30 | 277.30 | 195.10 | mg FA/g |
| Free Fatty Acids as Oleic | 4.51 | 6.82 | 11.90 | 7.01 | 8.42 | 14.30 | % |

TABLE 8

| Mono and Diglycerides by HPLC | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| Diglycerides | 3.23 | 2.96 | 3.15 | 5.29 | 5.35 | 4.30 | % (w/w) |
| Monoglycerides | 0.06 | 0.07 | 0.19 | 0.36 | 0.37 | 0.39 | % (w/w) |
| Soaps | 1,170.00 | 311.00 | 8,880.00 | 20,700.00 | 877.00 | 213,000.00 | Ppm |
| Total Waxes | | | 893 | | | 215 | mg/Kg |

Example 6

Figure 7A:
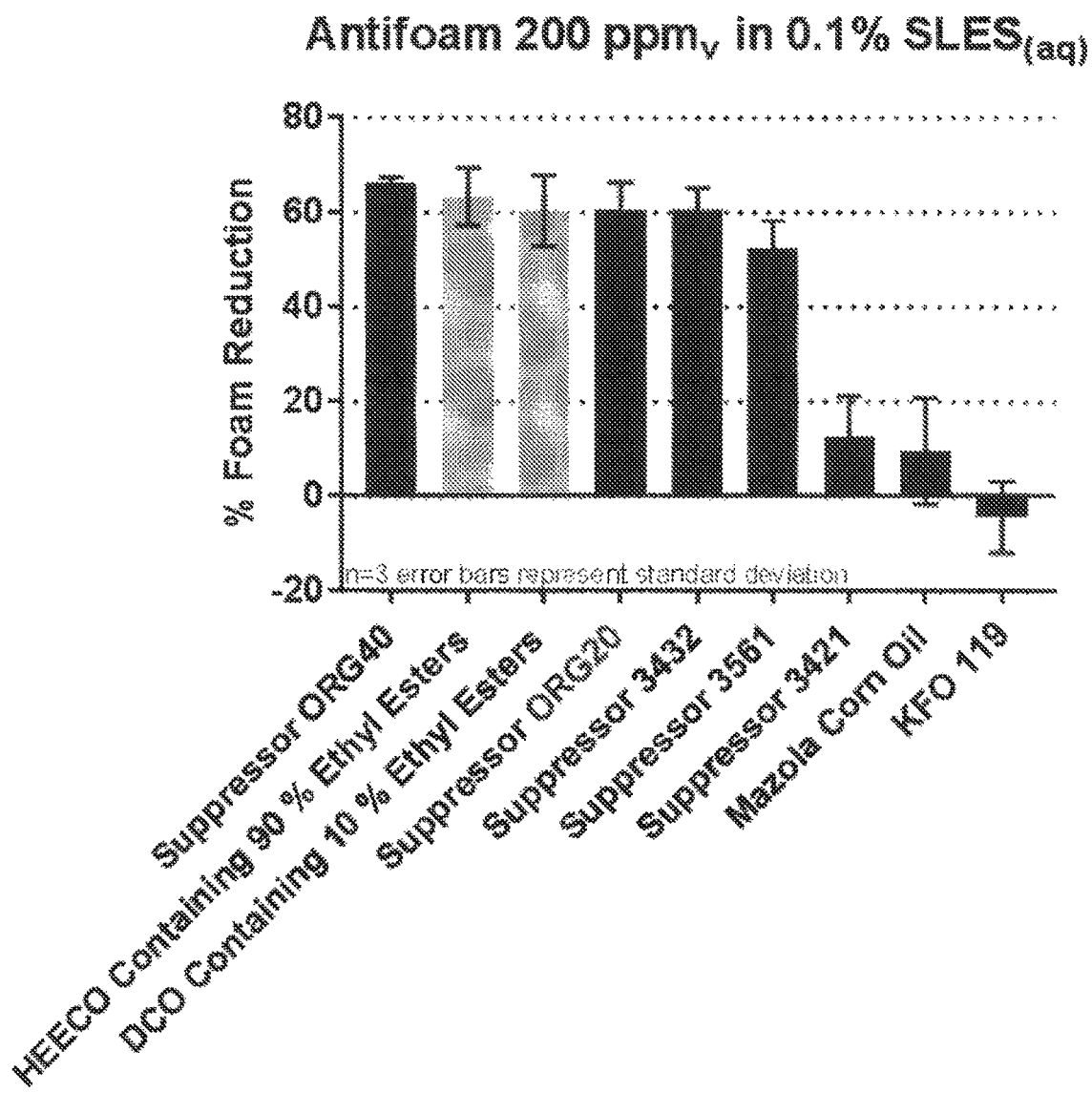
FIG. 7A illustrates data from Example 6 and shows the volumetric percent foam reduction for a grain oil composition containing 90% ethyl esters, a grain oil composition containing 10% ethyl esters, six commercially available antifoam products, and food-grade refined Mazola corn oil when using a model substrate (0.1 mass % SLES in water)

FIG. 7A shows the volume percent foam reduction for a HEECO sample containing 90% ethyl esters, a DCO sample containing 10% ethyl esters, six commercially available antifoam products, and food-grade, refined Mazola corn oil. The HEECO containing 90% ethyl esters described herein was produced by combining DCO with ethanol in the presence of lipase. The data in FIG. 7A was generated by following the antifoam testing procedure, outlined above. An aqueous solution of sodium lauryl ether sulfate (SLES) was used as substrate. The aqueous solution of SLES contained 0.1 mass % SLES in water. Antifoam was added at a dose rate of 200 ppmv.

Figure 7B:
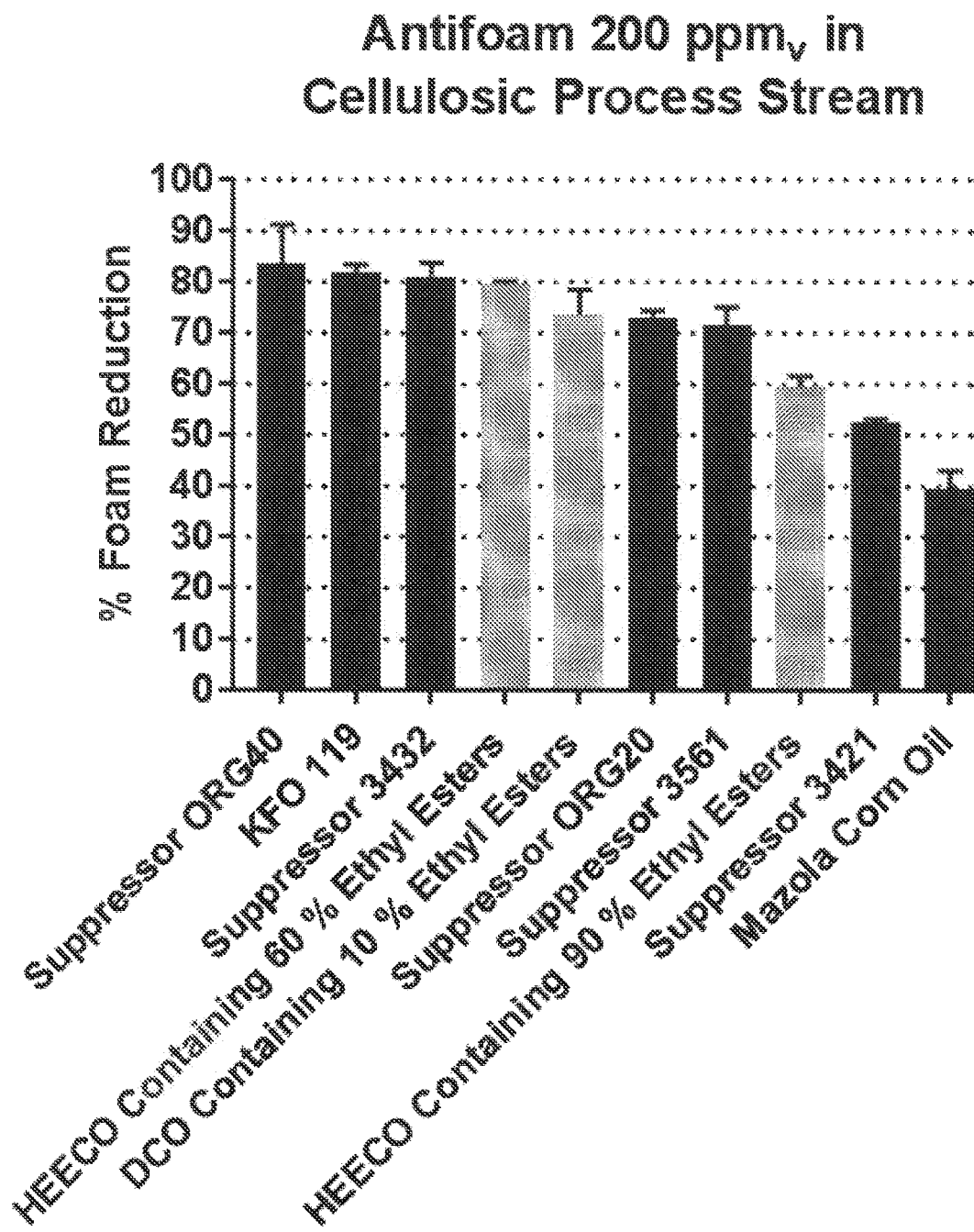
FIG. 7B illustrates data from Example 6 and shows the volumetric percent foam reduction for a grain oil composition containing 90% ethyl esters, a grain oil composition containing 60% ethyl esters, a grain oil composition containing 10% ethyl esters, six commercially available antifoam products, and food-grade refined Mazola corn oil when using evaporated thin stillage from a cellulosic ethanol facility as substrate.

FIG. 7B shows the volume percent foam reduction for a HEECO sample containing 90% ethyl esters, a HEECO sample containing 60% ethyl esters, a DCO sample containing 10% ethyl esters, six commercially available antifoam products, and food-grade, refined Mazola corn oil. The data in FIG. 7B was generated by following the antifoam testing procedure, outlined above except using an evaporated thin stillage sample from a cellulosic ethanol facility as substrate. Antifoam was added at a dose rate of 200 ppmv when generating the data shown in FIG. 7B.

Example 7

Example 7 measured Brookfield viscosity of various corn oil samples using a Brookfield viscometer having model number DV2TLVTJ0 at the conditions identified in Table 9 below and using a small sample adapter to maintain the temperature of the sample at 22C using a water bath.

anti-foam composition was tested and analyzed for its anti-foam characteristics using a Ross Miles Foam Analyzer (RMFA) in accordance with ASTM D 1173. The test used a

TABLE 9

|  | HEECO Heavy | 50% HEECO Heavy + 50% Mineral Oil | 25% HEECO Heavy + 75% Mineral Oil | HEECO | HEECO Light | DCO Heavy | DCO | DCO Light |
|---|---|---|---|---|---|---|---|---|
| Viscosity (centiPoise) | 165.9-169.2 | 37.8-38.4 | 24.96-25.11 | 41.94-42.84 | 17.10-17.16 | 224.7-232.2 | 60.0-63.9 | 39.3-39.9 |
| RPM | 100 | 100 | 100 | 100 | 100 | 100 | 100 | 100 |
| Spindle | 31 | 31 | 18 | 18 | 18 | 31 | 31 | 31 |
| Temperature ° C. | 22 | 22 | 22 | 22 | 22 | 22 | 22 | 22 |

Example 8

Figure 8A:
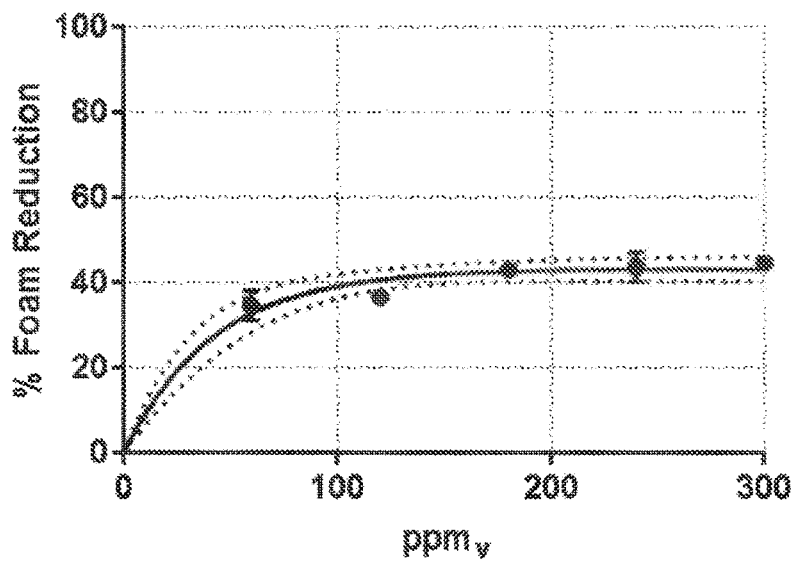
FIGS. 8A through 8G illustrate data from Example 8 and show that corn oil based antifoam compositions were effective at reducing foam in a sample of evaporated thin stillage from a cellulosic ethanol facility.
Figure 8B:
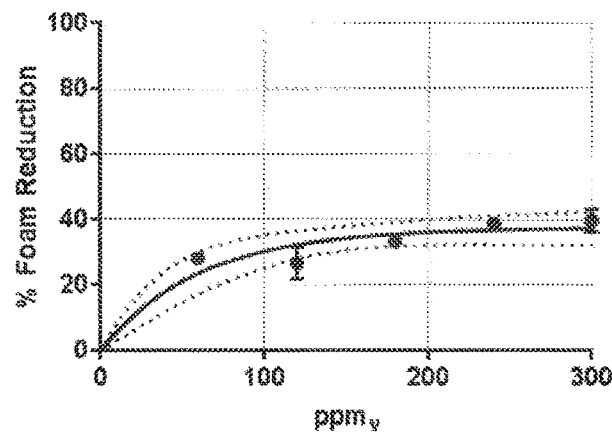
Figure 8A:
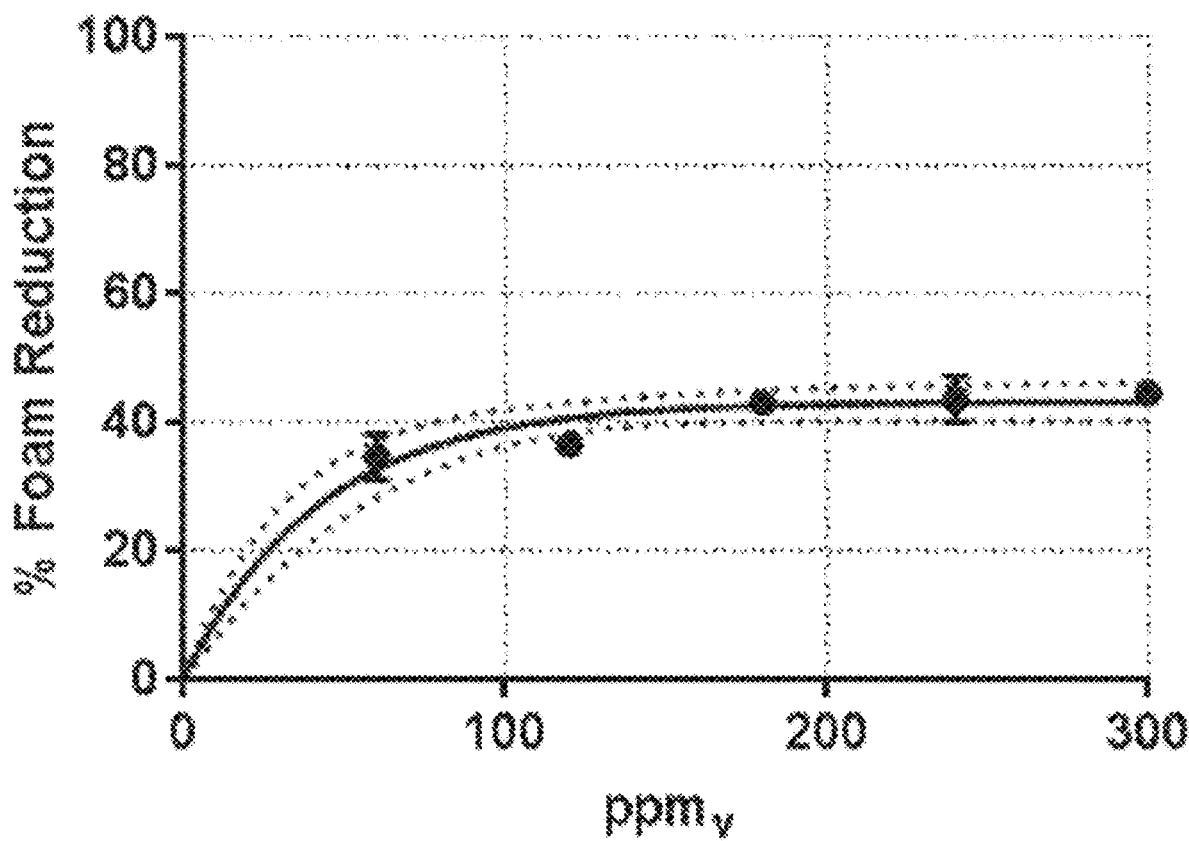
Figure 8B:
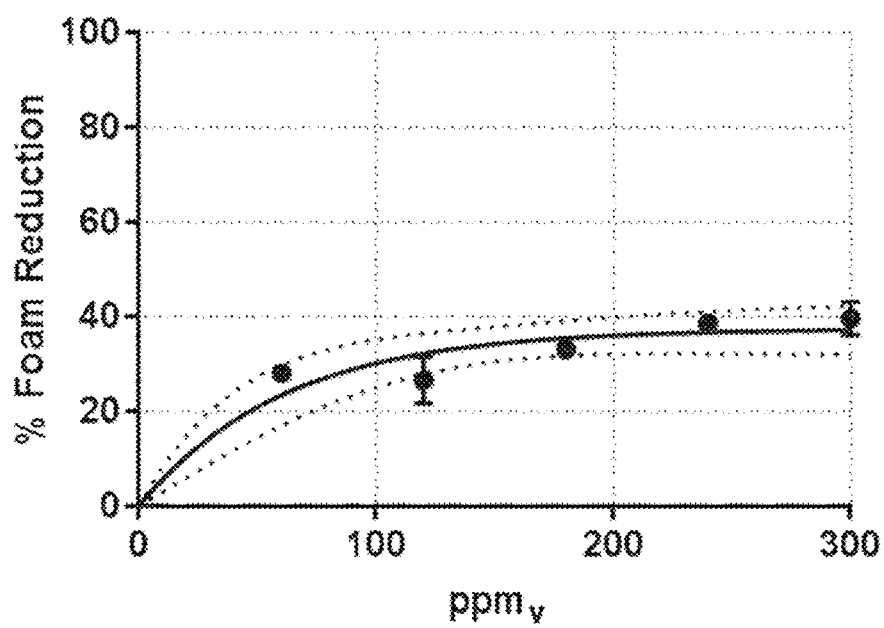
Figure 8C:
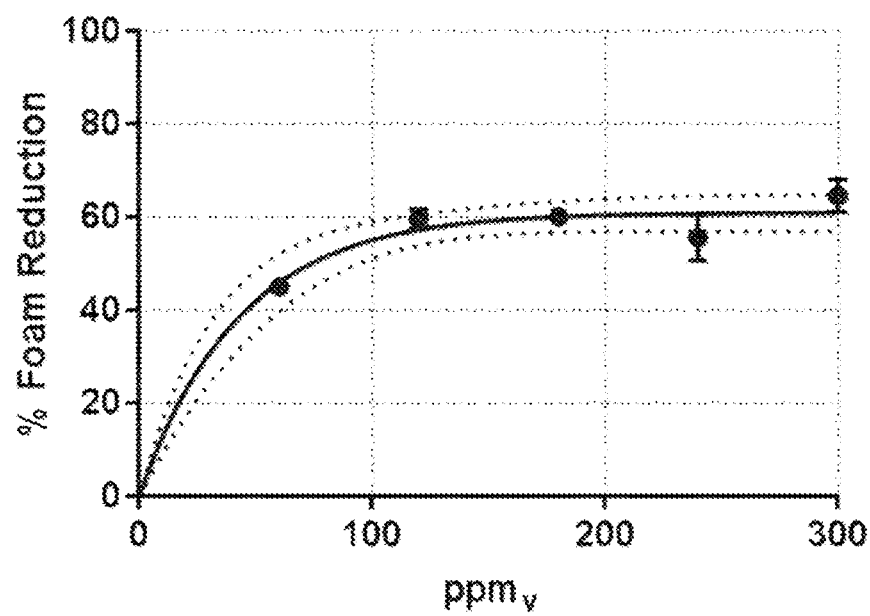
Figure 8D:
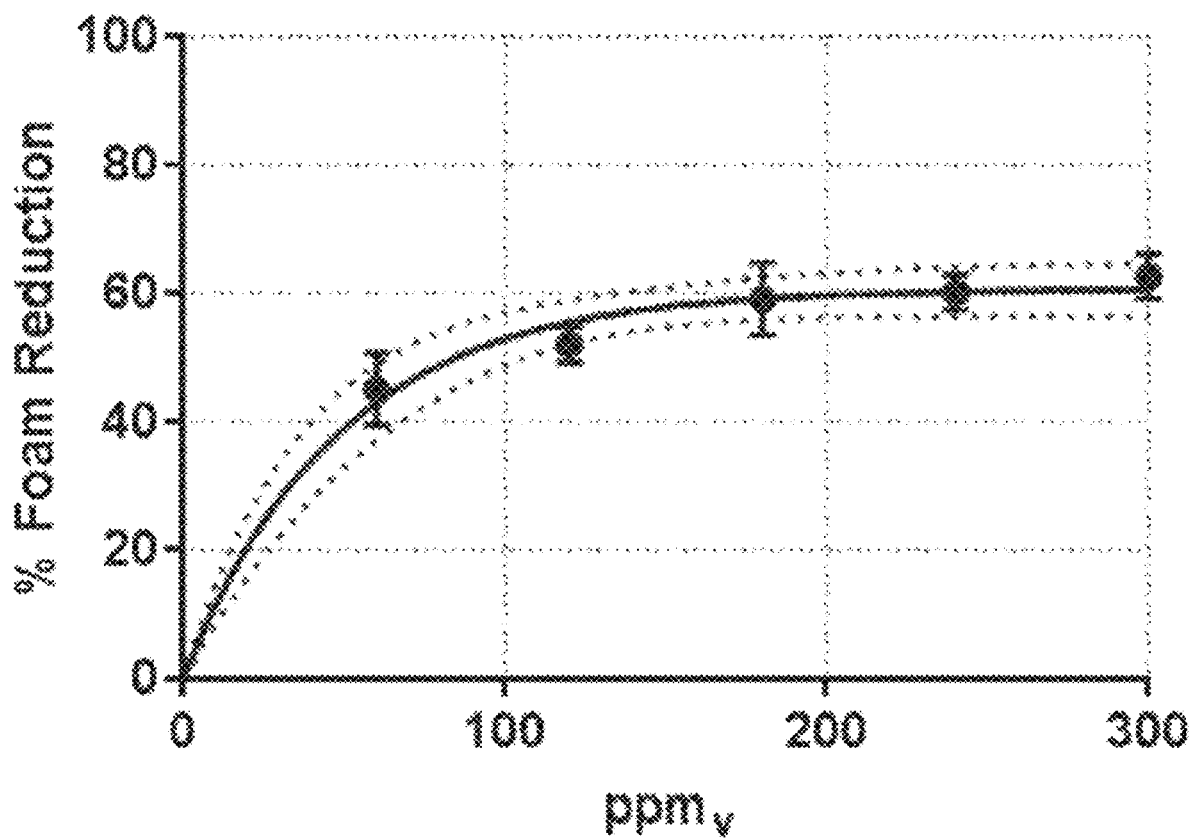
Figure 8E:
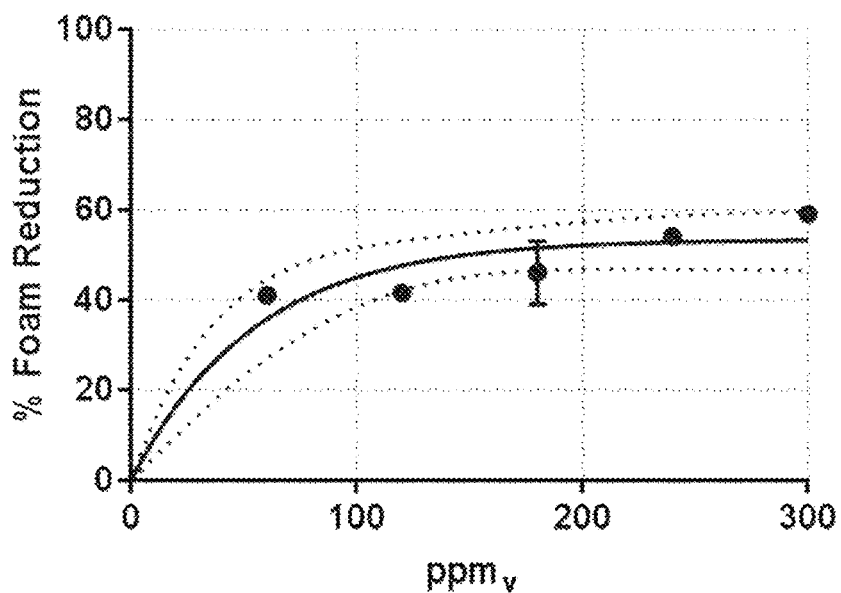
Figure 8C:
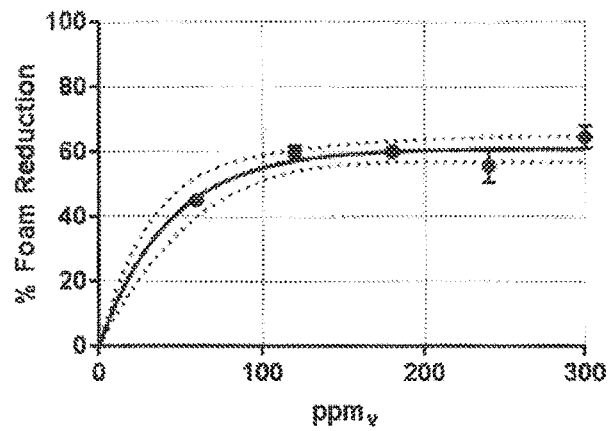
Figure 8D:
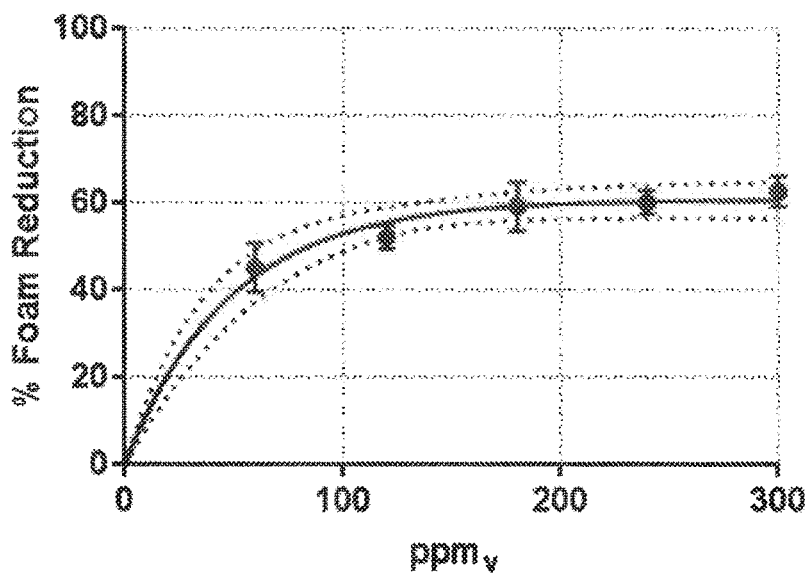
Figure 8F:
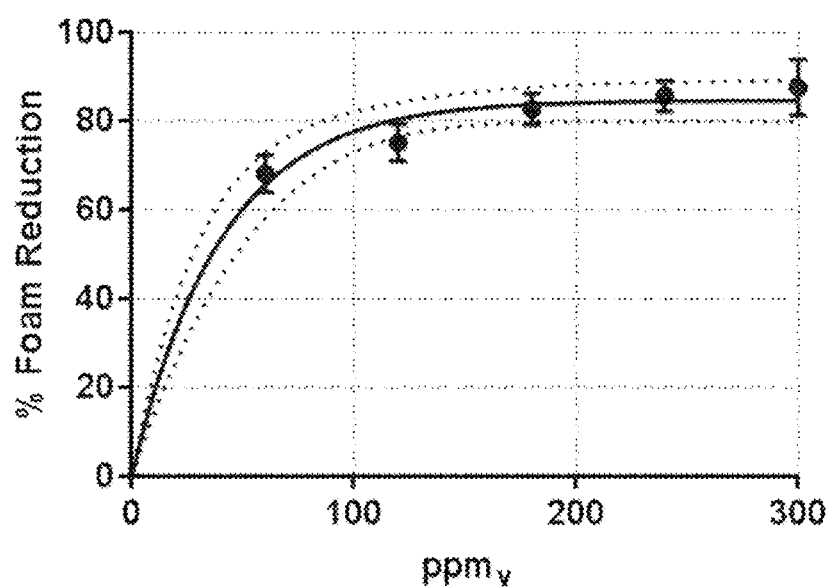
Figure 8G:
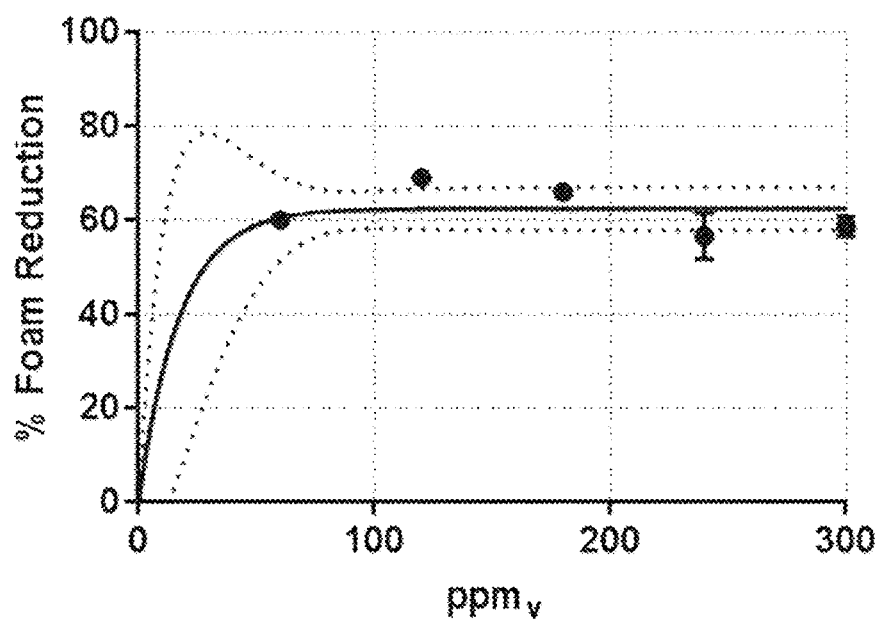

The sample of DCO in FIGS. 8A-C is the same sample as in FIG. 7B, but was performed on a different day using a different foaming cellulosic substrate. The sample of HEECO used in FIGS. 8D-8G is a different sample than that used in FIG. 7B. DCO, DCO light phase fraction.

DCO heavy phase fraction, HEECO, HEECO light phase fraction, HEECO heavy phase fraction, and HEECO heavy phase fraction mixed with mineral oil may be effective in reducing foam at cellulosic ethanol bio-refineries, e.g. reducing foaming when concentrating liquids after solid liquid separation of cellulosic stillage. For example, the data in FIGS. 8A through 8G show that these corn oil based antifoams are effective at reducing foam in a sample of evaporated thin stillage from a cellulosic ethanol facility. The HEECO used to generate the data in FIGS. 8D through 8G contained approximately 60% ethyl esters. The antifoam testing procedure, outlined above, was used to generate the data shown in FIGS. 8A through 8G and an evaporated thin stillage sample from a cellulosic ethanol facility was used as substrate.

Table 10 is a table that shows the volume percent foam reduction. The values in Table 10 are the point at which the curves in FIGS. 8A through 8G plateau.

0.1% solution of sodium lauryl ether sulfate (SLES) to generate a foam. Each anti-foam composition was dosed at 200 ppm. All results are n=4 with error bars representing standard deviation.

Figure 9:
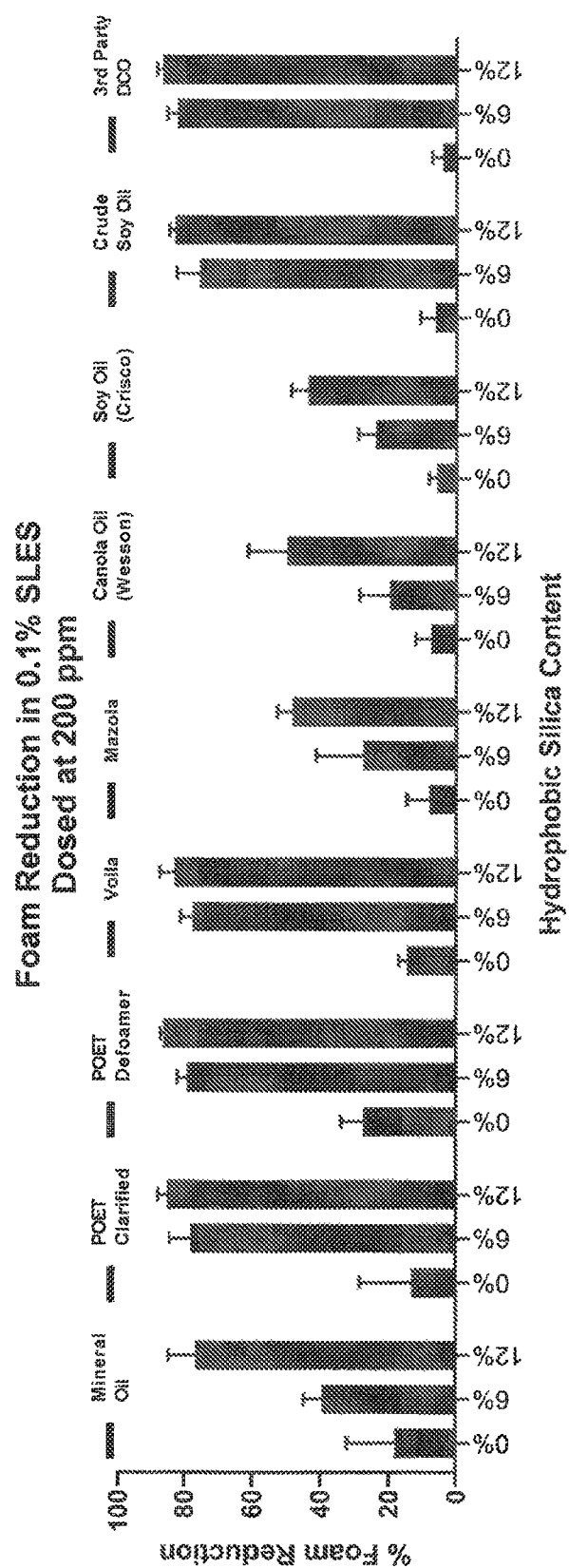
FIG. 9 illustrates data from Example 9 as described below.

In FIG. 9, "POET clarified" and "POET defoamer" are examples of grain oils that were recovered post-distillation from a dry-grind corn ethanol process using the water refining process described herein with respect to FIG. 1 and related text. "POET clarified" refers to the light phase (corn oil product) and "POET defoamer" refers to the heavy phase (emulsion phase). "Voila®" corn oil is also an example of a grain oil that was also recovered post-distillation from a dry-grind corn ethanol process. The "Voila®" corn oil was made using a raw starch conversion process as described in U.S. Pat. No. 7,842,484 (Lewis) and 7,919,291 (Lewis et al.). "3$^{rd}$ party DCO" means third party distiller's corn oil that used a jet-cooking process to convert starch to glucose and was recovered post-distillation from a corn ethanol process, and is another example of a crude vegetable oil. The Mazola® corn oil, Wesson® canola oil, and Crisco® soy oil are examples of refined vegetable oil.

As shown in FIG. 9, some oils can provide surprisingly more effective foam control when combined with hydrophobic particles such as hydrophobic silica particles, as compared to other oils (e.g., oils that have been treated to remove components such as, e.g., fatty acids), and/or as

TABLE 10

|  | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | HEECO Heavy Phase/Mineral Oil Mix |
|---|---|---|---|---|---|---|---|
| Volume % Foam Reduction (Plateau) | 43.1 | 37.34 | 60.9 | 60.58 | 53.33 | 84.54 | 62.41 |

Example 9

An experiment was conducted with oils from different sources as a carrier oil in an anti-foam composition. Each anti-foam composition was prepared by adding an amount of "anti-foam" additive to the carrier oil. For each carrier oil from a given source, the amount of anti-foam additive was varied from 0 weight percent, 6 weight percent, and 12 weight percent based on the total weight of anti-foam composition. The anti-foam additive used in these tests was a 50:50 mixture of Dumacil® 100 FGK hydrophobic silica powder and Dumacil® 300 FGK hydrophobic silica powder, both of which are commercially available. Each resulting compared to mineral oil. While not being bound by theory, it is believed that one or more components that are present (endogenously present and/or chemically formed in-situ during processing of the oil) in grain oil can enhance its anti-foam characteristic. For example, free fatty acids and/or fatty acid ethyl esters can be generated during ethanol production and are present at levels not present in many food grade oils. For example, one or more processes of refining (e.g., alkali refining), deodorizing, and the like may remove free fatty acids to form refined oil, thereby reducing the anti-foam characteristic of the refined vegetable oil.

Also, while not being bound by theory, it is believed that one or more fatty acid ethyl esters present in crude vegetable oil (endogenously present and/or chemically formed in-situ during processing of the oil) may enhance its anti-foam performance as compared to other crude vegetable oils that do not have any or a lower amount of one or more endogenous fatty acid alkyl esters.

Example 10

Example 10 shows compositional analysis of various corn oils. In Table 11 below, "Voila" refers Voila® corn oil, which is a distiller's corn oil and is made in a manner similar to grain oil composition feedstock 317 in FIG. 3. "Clarified Voila" refers to the light phase (corn oil product) and "Voila dehydrated chilled solids" refers to a dehydrated heavy phase (dehydrated emulsion phase) produced via water refining similar to that described above with respect to FIGS. 1 and 4.

TABLE 11

| Test | Analyte | Unit | Voila | Voila Dehydrated Chilled Solids | Mazola Corn Oil | Clarified Voila | Crude Soy Oil | 3rd Party DCO |
|---|---|---|---|---|---|---|---|---|
| Ash | Ash | ppm | <1 | <1 | 16.0 | <1 | <1 | <1 |
| Brookfield Viscosity @20° C. | Viscosity | CP | 55.57 | 74.60 | 60.75 | 44.90 | 45.40 | 54.03 |
| Caloric Value | Caloric Value | cal/100 g | 898.4 | 898.7 | 899.9 | 898.4 | 899.2 | 897.4 |
| Carotenes | Alpha Carotene | mcg/g | 0.2 | 0.2 | <0.200 | 0.4 | | 1.4 |
| Carotenes | Beta Carotene | mcg/g | 4.8 | 3.2 | <0.200 | 5.6 | | 16.5 |
| Carotenes | Trans Beta Carotene | mcg/g | 2.2 | 1.3 | <0.200 | 2.4 | | 7.0 |
| Cloud Point | Cloud Point | ° C. | 3.2 | 6.5 | −10.0 | −10.0 | −10.2 | −10.0 |
| Color | 1" Lovibond Red | | 12.2 | 12.0 | 3.4 | 13.1 | 3.9 | 20.0 |
| Color | 1" Lovibond Yellow | | 70.0 | 70.0 | 50.0 | 70.0 | 70.0 | 50.0 |
| Density@20° C. | Density | g/cm^3 | 0.9142 | 0.9150 | 0.9194 | 0.9150 | 0.9249 | 0.9161 |
| Elemental Analysis | Arsenic | ppm | ND | ND | ND | ND | ND | ND |
| Elemental Analysis | Cadmium | ppm | ND | ND | ND | ND | 0.5 | ND |
| Elemental Analysis | Calcium | ppm | 8.3 | 24.3 | ND | ND | 63.7 | ND |
| Elemental Analysis | Chlorides | % | 0.1 | 0.0 | 0.1 | 0.1 | 0.0 | 0.0 |
| Elemental Analysis | Copper | ppm | | 0.0 | | | | |
| Elemental Analysis | Iron | ppm | | 9.5 | | | | |
| Elemental Analysis | Lead | ppm | ND | ND | ND | ND | ND | ND |
| Elemental Analysis | Magnesium | ppm | 42.9 | 421.0 | ND | ND | 89.7 | ND |
| Elemental Analysis | Manganese | ppm | | 2.3 | | | | |
| Elemental Analysis | Mercury | ppm | ND | ND | ND | ND | ND | ND |
| Elemental | Nitrogen | ppm | ND | 0.0 | ND | ND | 0.0 | ND |
| Elemental Analysis | Phosphorus | ppm | 28.6 | 94.1 | 0.3 | 2.0 | 1240.0 | 2.4 |
| Elemental | Potassium | ppm | 23.8 | 87.3 | 4.1 | 7.2 | 718.0 | 8.7 |
| Elemental Analysis | Sodium | ppm | 71.8 | 412.0 | ND | 1.9 | ND | 1.9 |
| Elemental Analysis | Sulfur | ppm | 19.5 | 38.0 | 4.2 | 16.3 | 16.1 | 28.2 |
| Elemental Analysis | Zinc | ppm | | 0.0 | | | | |
| Fatty Acid Ethyl Esters | Ethyl Linoleate | mass | 5.41 | 4.95 | 0 | 4.07 | 0 | 2.85 |
| Fatty Acid Ethyl Esters | Ethyl Linolenate | Mass % | 0.08 | 0.09 | 0 | 0.06 | 0 | 0.03 |
| Fatty Acid Ethyl Esters | Ethyl Oleate | Mass % | 1.92 | 1.68 | 0 | 1.26 | 0 | 0.67 |
| Fatty Acid Ethyl Esters | Ethyl Palmitate | Mass% | 3.05 | 2.73 | 0 | 2.38 | 0 | 1.13 |
| Fatty Acid Ethyl Esters | Ethyl Stearate | Mass% | 0.15 | 0.13 | 0 | 0.08 | 0 | 0 |
| Fatty Acid Ethyl Esters | Total Fatty Acid Ethyl Esters | Mass% | 10.62 | 9.59 | 0 | 7.84 | 0 | 4.68 |
| Fatty Acid Profile | Arachidic | mg/g | 4.0 | 4.0 | 3.9 | 4.1 | | 3.6 |
| Fatty Acid Profile | Behenic | mg/g | 1.9 | 2.1 | 1.4 | 1.6 | | 1.7 |
| Fatty Acid Profile | Capric | mg/g | 0.0 | 0.0 | 0.0 | 0.0 | | 0.0 |
| Fatty Acid Profile | Caprioc | mg/g | 0.0 | 0.0 | 0.0 | 0.0 | | 0.0 |
| Fatty Acid Profile | Caprylic | mg/g | 0.0 | 0.0 | 0.0 | 0.0 | | 0.0 |
| Fatty Acid Profile | Eicosenoic | mg/g | 2.7 | 2.7 | 2.7 | 2.6 | | 2.6 |
| Fatty Acid Profile | Erucic | mg/g | 0.7 | 0.7 | 0.4 | 0.5 | | 0.4 |
| Fatty Acid Profile | Lauric | mg/g | 0.1 | 0.1 | 0.0 | 0.1 | | 0.0 |
| Fatty Acid Profile | Lauroleic | mg/g | 0.0 | 0.0 | 0.0 | 0.0 | | 0.0 |
| Fatty Acid | Lignoceric | mg/g | 2.1 | 2.5 | 1.6 | 2.1 | | 2.2 |
| Fatty Acid Profile | Linoleic + | mg/g | 539.2 | 532.6 | 553.4 | 541.6 | | 551.2 |
| Fatty Acid Profile | Linolenic, | mg/g | 0.0 | 0.0 | 0.0 | 0.0 | | 0.0 |
| Fatty Acid Profile | Linolenic, alpha | mg/g | 13.5 | 13.4 | 8.9 | 13.5 | | 13.6 |
| Fatty Acid Profile | Margaric | mg/g | 0.7 | 0.7 | 0.7 | 0.7 | | 0.7 |
| Fatty Acid Profile | Margaroleic | mg/g | 0.3 | 0.3 | 0.3 | 0.3 | | 0.3 |
| Fatty Acid Profile | Myristic | mg/g | 0.6 | 0.6 | 0.3 | 0.6 | | 0.4 |
| Fatty Acid Profile | Myristoleic | mg/g | 0.0 | 0.0 | 0.0 | 0.0 | | 0.0 |
| Fatty Acid Profile | Oleic + Isomers | mg/g | 277.5 | 279.1 | 290.9 | 277.4 | | 266.9 |
| Fatty Acid Profile | Other Fatty Acids | mg/g | 0.2 | 0.3 | 0.1 | 0.1 | | 0.1 |
| Fatty Acid Profile | other isomers | mg/g | 0.0 | 0.0 | 0.0 | 0.0 | | 0.0 |
| Fatty Acid Profile | Palmitic | mg/g | 135.0 | 138.5 | 115.3 | 133.1 | | 136.0 |
| Fatty Acid Profile | Palmitoleic] | mg/g | 1.2 | 1.2 | 0.9 | 1.2 | | 1.0 |

TABLE 11-continued

| Test | Analyte | Unit | Voila | Voila Dehydrated Chilled Solids | Mazola Corn Oil | Clarified Voila | Crude Soy Oil | 3rd Party DCO |
|---|---|---|---|---|---|---|---|---|
| Fatty Acid Profile | Pentadadecylic | mg/g | 0.0 | 0.0 | 0.0 | 0.0 | | 0.0 |
| Fatty Acid Profile | Pentadadecyloleic | mg/g | 0.0 | 0.0 | 0.0 | 0.0 | | 0.0 |
| Fatty Acid Profile | Stearic | mg/g | 19.5 | 20.3 | 16.6 | 19.4 | | 18.1 |
| Fatty Acid Profile | Stearidonic | mg/g | 0.0 | 0.0 | 0.0 | 0.0 | | 0.0 |
| Fatty Acid Profile | Tetracosenoic | mg/g | 0.8 | 0.9 | 2.6 | 1.1 | | 1.2 |
| Flash Point | Flash Point | PF | 420.0 | 407.0 | >550 | 430.0 | 575.0 | 417.0 |
| Free Fatty Acid | Free Fatty Acid (Oleic) | 0% | 4.0 | 14.8 | 0.1 | 3.9 | 0.5 | 12.7 |
| Free Glycerol | Glycerol | % | <0.05 | 0.1 | <0.05 | <0.05 | <0.05 | 0.1 |
| Glycerides | Diglycerides | % | 5.49 | 14.9 | 3.2 | 5.3 | 2.1 | 13.0 |
| Glycerides | Monoglycerides | % | 0.64 | 5.3 | 0.8 | 0.7 | 3.4 | 2.3 |
| Glycerides | Triglycerides | % | 82.06 | 78.3 | 86.7 | 81.1 | 86.0 | 75.5 |
| Insoluble Impurities | Insolubles | % | 0.0 | 0.1 | 0.0 | 0.0 | 0.0 | 0.0 |
| Iodine Value | Iodine | | 119.7 | 118.8 | 123.2 | 121.8 | 133.3 | 120.6 |
| Moisture | Moisture (K/F) | % | 0.2 | 0.1 | 0.0 | 0.2 | 0.1 | 0.3 |
| Oxadative Stability Index | OSI | hour S | 8.5 | 3.1 | 5.0 | 8.6 | | 9.0 |
| p-Anisidine Value | p-Anisidine Value | | 22.8 | 21.7 | 10.6 | 21.4 | 0.6 | 22.7 |
| Peroxide Value | Peroxide | meq/kg | 0.2 | 2.5 | 28.5 | 0.0 | 0.0 | 0.3 |
| Pour Point | Pour Point | °C. | -6.8 | 2.3 | -8.1 | -9.3 | -6.8 | -10.6 |
| Smoke Point | Smoke Point | F | 360.0 | 313.0 | 493.0 | 320.0 | 460.0 | 300.0 |
| Soaps | Soap as Sodium oleate | ppm | 1717.0 | 7983.0 | <1 | <1 | 438.0 | <1 |
| Sterols | 24-methylene-cholesterol | % | 0.8 | 0.6 | 0.9 | 0.7 | 0.2 | 0.4 |
| Sterols | Apparent β-Sitosterol | | 69.7 | 71.0 | 71.5 | 69.5 | 55.6 | 72.2 |
| Sterols | Brassicaserol | % | 0.1 | 0.0 | 0.0 | 0.0 | 0.1 | 0.0 |
| Sterols | Campestanol | % | 5.4 | 5.9 | 1.3 | 6.0 | 0.5 | 5.2 |
| Sterols | Campesterol | % | 16.7 | 15.4 | 18.5 | 16.7 | 23.7 | 15.2 |
| Sterols | Cholesterol | % | 0.3 | 0.7 | 0.3 | 0.2 | 0.3 | 0.1 |
| Sterols | Clerosterol | % | 0.9 | 0.7 | 0.7 | 0.9 | 0.3 | 0.8 |
| Sterols | Erythrodiol | % | 0.0 | 0.0 | 0.0 | 0.0 | 0.0 | 0.0 |
| Sterols | Sitostanol | % | 14.6 | 5.4 | 3.5 | 3.4 | 0.0 | 16.2 |
| Sterols | Stigmasterol | % | 4.7 | 4.3 | 6.2 | 4.5 | 16.2 | 4.6 |
| Sterols | Total Sterols | % | 1.9 | 1.9 | 1.1 | 1.9 | 0.5 | 2.4 |
| Sterols | Total Sterols | ppm | 19145.0 | 18763.0 | 11293.0 | 19339.0 | 4589.0 | 23653.0 |
| Sterols | Uvaol | % | 0.0 | 0.0 | 0.0 | 0.0 | 0.0 | 0.0 |
| Sterols | β-sitosterol | % | 50.0 | 49.3 | 64.4 | 48.7 | 0.7 | 50.7 |
| Sterols | Δ-5,23-stigmastadienol | % | 0.5 | 0.9 | 0.2 | 0.4 | 0.4 | 0.4 |
| Sterols | 5,24-stigmasadienol | % | 0.6 | 0.3 | 0.4 | 0.5 | 0.8 | 0.6 |
| Sterols | Δ-5-avenasterol | % | 3.2 | 14.4 | 2.4 | 15.5 | 2.2 | 3.5 |
| Sterols | Δ-7-Avenasterol | % | 1.1 | 1.0 | 0.6 | 1.2 | 1.3 | 1.2 |
| Sterols | Δ-7-Campesterol | % | 0.4 | 0.3 | 0.3 | 0.3 | 0.6 | 0.3 |
| Sterols | Stigmastenol | | 1.0 | 0.7 | 0.4 | 1.0 | 1.5 | 0.9 |
| Tocopherol/Tocotrienols | Total Tocopherols | ppm | 491.5 | 419.5 | 560.8 | 610.4 | 1008.2 | 884.4 |
| Tocopherol/Tocotrienols | Total Tocotrienols | ppm | 436.1 | 435.5 | ND | 361.3 | ND | 536.7 |
| Tocopherol/Tocotrienols | Total Vitamin E | ppm | 927.6 | 855.0 | 560.8 | 971.7 | 1008.2 | 1421.1 |
| Tocopherol/Tocotrienols | α-Tocotrienol | ppm | 140.8 | 109.6 | 170.5 | 175.2 | 104.1 | 274.6 |
| Tocopherol/Tocotrienols | α-Tocotrienol | ppm | 151.4 | 217.6 | ND | 169.5 | ND | 201.8 |
| Tocopherol/Tocotrienols | β-tocopherol | ppm | ND | ND | ND | ND | 23.5 | 292.5 |
| Tocopherol/Tocotrienols | β-Tocotrienol | ppm | ND | ND | ND | ND | ND | ND |
| Tocopherol/Tocotrienols | γ-Tocotrienol | ppm | 350.7 | 275.4 | 330.8 | 394.3 | 495.7 | 277.0 |
| Tocopherol/Tocotrienols | γ-Tocotrienol | ppm | 284.7 | 217.9 | ND | 191.9 | ND | 334.9 |
| Tocopherol/Tocotrienols | δ-tocopherol | ppm | ND | 34.5 | 59.4 | 40.9 | 384.9 | 40.5 |
| Tocopherol/Tocotrienols | δ-tocopherol | ppm | ND | ND | ND | ND | ND | ND |
| Trans Fat | Trans Fat | % | 0.1 | 0.1 | 0.2 | 0.1 | 0.0 | 0.1 |
| Unsaponifiable matter | Unsaponifiables | % | 1.9 | 1.7 | 0.9 | 2.0 | 0.5 | 2.1 |

Example 11

In a shelf stability study, an unmodified emulsion product prepared according to the present disclosure was compared to stabilized emulsion products treated with sodium hydroxide as described herein. Results are provided below in Tables 12A and 12B. The unmodified emulsion (C-1) separated into two phases within about 24 hours, while the two inventive stabilized emulsions (I-1 and I-2) remained homogenous as a single phase for at least about two weeks when stored at room temperature (about 20° C. to about 25° C.).

TABLE 12A

| Emulsion - Treatments | | Free Fatty Acids [%] | Soap Sodium Oleate [ppm] | Free Glycerol [%] | Monoglycerides [%] | Diglycerides [%] | Triglycerides [%] |
|---|---|---|---|---|---|---|---|
| C-1 | Unmodified | 4.86 | 1749 | 0.10 | 5.64 | 6.95 | 81.57 |
| I-1 | 0.1% v/v of 50% w/v NaOH | 3.36 | 15025 | 0.10 | 6.09 | 4.22 | 85.45 |
| I-2 | 0.25% v/v of 50% w/v NaOH | 2.20 | 27911 | 0.10 | 6.34 | 3.75 | 83.30 |

Table 12B

| Emulsion | | Soap: Total Glycerides | Soap: Free Fatty Acids |
|---|---|---|---|
| C-1 | Unmodified | 1:538.4 | 1:27.8 |
| I-1 | 0.1% v/v of 50% w/v NaOH | 1:64.5 | 1:2.6 |
| I-2 | 0.25% v/v of 50% w/v NaOH | 1:33.5 | 1:0.8 |

As shown in Tables 12A and 12B, because the soaps are retained in the inventive stabilized emulsions I-1 and I-2, the stabilized emulsions have a higher level of soap relative to total glycerides or relative to total free fatty acids in the emulsion as compared to the unmodified versions C-1 (thus, the decreasing ratio of Table 12B reflecting higher amounts of soap relative to the glycerides or FFA in the emulsions). Further compositional analysis of another exemplary sodium hydroxide treated emulsion product was conducted and provided below in Table 13 via a NIR analysis method.

TABLE 13

| | NIR Compositional analysis | | | | |
|---|---|---|---|---|---|
| NIR analysis | Fatty Acid Ethyl Ester mass % | Free Fatty Acid mass % | Insoluble mass % | Moisture mass % | Unsaponifiable Matter mass % |
| 0.1% v/v of 50% w/v NaOH modified emulsions | 15.6 | 3.5 | 0.2 | 0.3 | 2 |

Example 12

A study was conducted of the viscosity of an emulsion product after 2 weeks of room temperature storage and with varying treat rates of a 50% sodium hydroxide solution. Results are provided in Table 14 below.

TABLE 14

| | Spindle# | Temperature [° C.] | Speed [RPM] | Viscosity [cP] |
|---|---|---|---|---|
| Unmodified Emulsion | 64 | 23 | 100 | 42 |
| Unembodied Emulsion | 64 | 23 | 200 | 45 |
| 0.15% v/v 50% NaOH | 64 | 23 | 100 | 174 |
| 0.15% v/v 50% NaOH | 64 | 23 | 200 | 150 |
| 0.20% v/v 50% NaOH | 64 | 23 | 100 | 198 |

TABLE 14-continued

| | Spindle# | Temperature [° C.] | Speed [RPM] | Viscosity [cP] |
|---|---|---|---|---|
| 0.20% v/v 50% NaOH | 64 | 23 | 200 | 153 |
| 0.27% v/v 50% NaOH | 64 | 23 | 100 | 810 |
| 0.27% v/v 50% NaOH | 64 | 23 | 200 | 642 |
| 0.30% v/v 50% NaOH | 64 | 23 | 100 | 648 |
| 0.30% v/v 50% NaOH | 64 | 23 | 200 | 447 |

Viscosity was measured using a Brookfield DV2T viscometer with the spindle, temperature, and speed as shown in the Table above. Based on the viscosity measurements, an exemplary preferred dosage is in the range of about 0.15 to about 0.27% v/v of sodium hydroxide solution because the viscosity drops off above and below such treat rates. Treat rates above 0.27% v/v also tend to result in non-homogeneous, clumpy emulsions. It is anticipated that other alkali metal bases can also be used to stabilize the product, such as potassium hydroxide or magnesium hydroxide. For instance, about 0.1% v/v of 50% w/v KOH and/or about 0.1% v/v of 50% w/v $Mg(OH)_2$ addition resulted in stabilized emulsions products with a viscosity close to unmodified emulsions; however, about 10% of oil phase separation was noted; thus, higher treat rates may be needed to achieve similar stability as sodium hydroxide with alternative metal base treatments.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of separating and stabilizing a grain oil composition to provide a homogenous emulsion, the method comprising:

fermenting a grain feedstock to form a fermented product including an oil fraction and an aqueous portion, and separating a thin stillage from the fermented product and processing the thin stillage to form the grain oil composition, wherein the processing includes concentrating the thin stillage into a syrup, separating the syrup into a defatted syrup and an emulsion, and treating the emulsion to form the grain oil composition, and wherein the treating includes adjusting the pH of the emulsion to break the emulsion into a defatted emulsion and the grain oil composition;

combining the grain oil composition with additional water to form an oil and water mixture;

exposing the oil and water mixture to a temperature and for a time effective for the oil and water mixture to form at least an oil phase and an emulsion phase;

separating at least a portion of the oil phase from the emulsion phase to form a heavy emulsion phase; and treating the heavy emulsion phase with an alkali or alkaline metal base to form the homogeneous emulsion.

2. The method of claim 1, wherein the temperature of the heavy emulsion phase during the treating is about 0° C. to about 50° C.

3. The method of claim 1, wherein the heavy emulsion phase is treated with about 0.1 to about 0.27% v/v of a solution of the alkali or alkaline metal base.

4. The method of claim 1, wherein the homogeneous emulsion has a pH of about 7 to about 12.

5. The method of claim 1, wherein the homogeneous emulsion is further dehydrated to form a dehydrated homogenous emulsion having water, but no more than about 3 weight percent water.

6. The method of claim 1, wherein the homogeneous emulsion has a soap content of about 500 ppm or greater and wherein the soap is a salt of a fatty acid and an alkali or an alkaline-earth metals.

7. The method of claim 6, wherein the soap content is about 2,000 to about 100,000 ppm.

8. The method of claim 1, wherein the homogeneous emulsion has a Brookfield viscosity of about 100 to about 1,000 cP at 23° C. and using spindle 64 and wherein the homogeneous emulsion maintains a single phase for at least two weeks at about 20° C. to about 25° C.

9. The method of claim 1, wherein the homogeneous emulsion has a triglyceride content of about 70 to about 90 weight percent based on the total weight of the homogeneous emulsion and wherein the homogenous emulsion has a weight ratio of soap to total glyceride content of about 1:30 to about 1:400.

10. The method of claim 1, wherein the homogeneous emulsion has a free fatty acid content of about 10 weight percent or less based on the total weight of the homogenous emulsion and wherein the homogenous emulsion has a weight ratio of soap to free fatty acid content of about 1:0.7 to about 1:30.

* * * * *